United States Patent [19]

Hirahara et al.

[11] Patent Number: 4,884,080
[45] Date of Patent: * Nov. 28, 1989

[54] COLOR IMAGE PRINTING APPARATUS

[75] Inventors: Shuzo Hirahara, Yokohama; Hitoshi Nagato; Kazuhiko Higuchi, both of Kawasaki; Kiyoshi Yamada, Chigasaki; Tadayoshi Ohno, Kawasaki; Tsutomu Kanai, Yokohama; Toshikazu Matsui, Tokyo, all of Japan

[73] Assignee: Kabushiki Kaisha Toshiba, Kawasaki, Japan

[*] Notice: The portion of the term of this patent subsequent to Feb. 9, 2005 has been disclaimed.

[21] Appl. No.: 56,763

[22] Filed: Jun. 2, 1987

Related U.S. Application Data

[63] Continuation-in-part of Ser. No. 821,954, Jan. 24, 1986, Pat. No. 4,724,446.

[30] Foreign Application Priority Data

Jan. 31, 1985 [JP] Japan .................. 60-16768
Jun. 28, 1985 [JP] Japan .................. 60-142108
Sep. 24, 1985 [JP] Japan .................. 60-208823
Jun. 2, 1986 [JP] Japan .................. 61-127616

[51] Int. Cl.$^4$ .................. G01D 15/10; H04N 1/23; G03C 5/00
[52] U.S. Cl. .................. 346/46; 346/76 PH; 358/75; 358/298; 358/456; 358/476; 400/120; 430/44; 430/293
[58] Field of Search .................. 346/76 PH, 46; 358/75, 358/283, 296, 298; 400/120; 430/44, 293

[56] References Cited

U.S. PATENT DOCUMENTS

| | | | |
|---|---|---|---|
| 3,922,484 | 11/1975 | Keller | 358/256 |
| 4,333,112 | 6/1982 | Matsumoto | 358/298 |
| 4,368,491 | 1/1983 | Saito | 358/283 |
| 4,394,693 | 7/1983 | Shirley | 358/298 |
| 4,412,225 | 10/1983 | Yoshida et al. | 346/1.1 |
| 4,477,833 | 10/1984 | Clark et al. | 358/80 |
| 4,486,788 | 12/1984 | Yamada | 358/298 |
| 4,532,523 | 7/1985 | Tanaka | 346/76 PH |
| 4,536,771 | 8/1985 | Tanaka | 346/76 PH |
| 4,578,713 | 3/1986 | Tsao et al. | 358/283 |
| 4,668,978 | 5/1987 | Gorita | 358/78 |
| 4,724,446 | 2/1988 | Hirahara et al. | 346/76 PH |

FOREIGN PATENT DOCUMENTS

| | | | |
|---|---|---|---|
| 59-179363 | 10/1984 | Japan | 400/120 |
| 60-78768 | 5/1985 | Japan | 400/120 |

OTHER PUBLICATIONS

Proceedings of the 1'st Non-Impact Printing Technologies Symposium, 3-6, pp. 51-54 (In Japanese); O. Asada et al.; 1984-7-24.

*Primary Examiner*—Clifford C. Shaw
*Assistant Examiner*—Gerald E. Preston
*Attorney, Agent, or Firm*—Oblon, Spivak, McClelland, Maier & Neustadt

[57] ABSTRACT

A color image printing apparatus prints one pixel by superposing a predetermined dots of three colors within a 3×3 dot matrix in accordance with a density of the pixel. The positions of the printed dots within the dot matrix are stored as a dot pattern for each color. One dot pattern is used for each of a plurality of densities included in one density range. The printing energy for each of the dots included in the dot pattern is controlled in accordance with the density level of the pixel. The dot pattern is different for each color and three dot patterns are stored for each color and for each density range. These three dot patterns are repeatedly used for every three pixels which are continuous in the horizontal direction. These three dot patterns have two or three texture directions. The texture direction other than the vertical direction is different for each color.

9 Claims, 32 Drawing Sheets

F I G. 4A   F I G. 4B   F I G. 4C
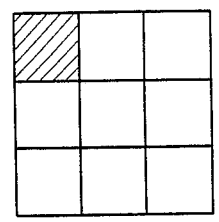 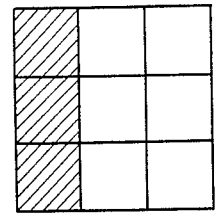 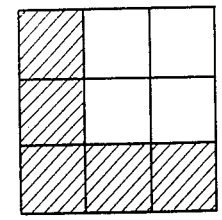
F I G. 5
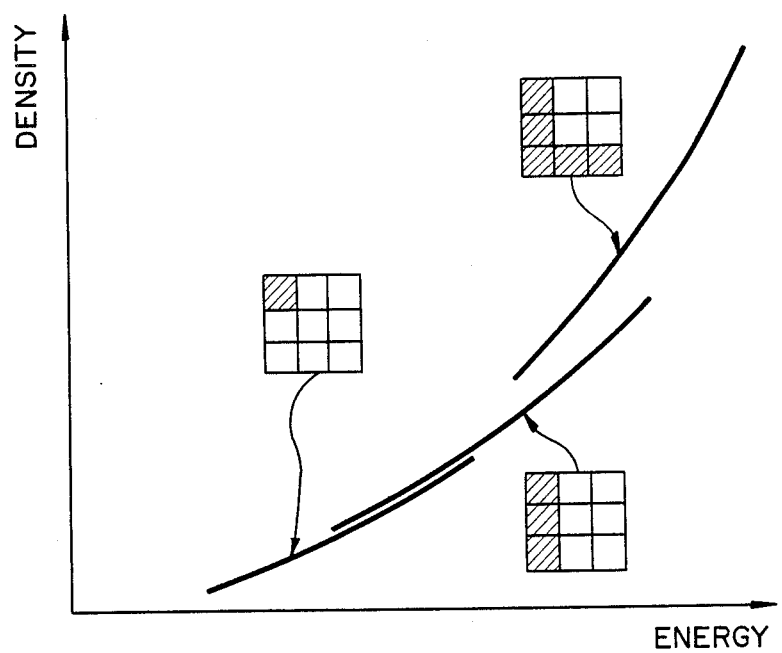

FIG. 6
| HALF-TONE GRADATION LEVEL | MULTI LEVEL DOT PATTERN |
|---|---|
| 0~4 | 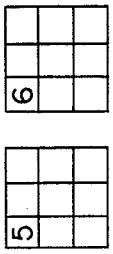 |
| 5~14 | 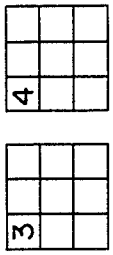 |
| 15~30 | 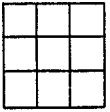 |

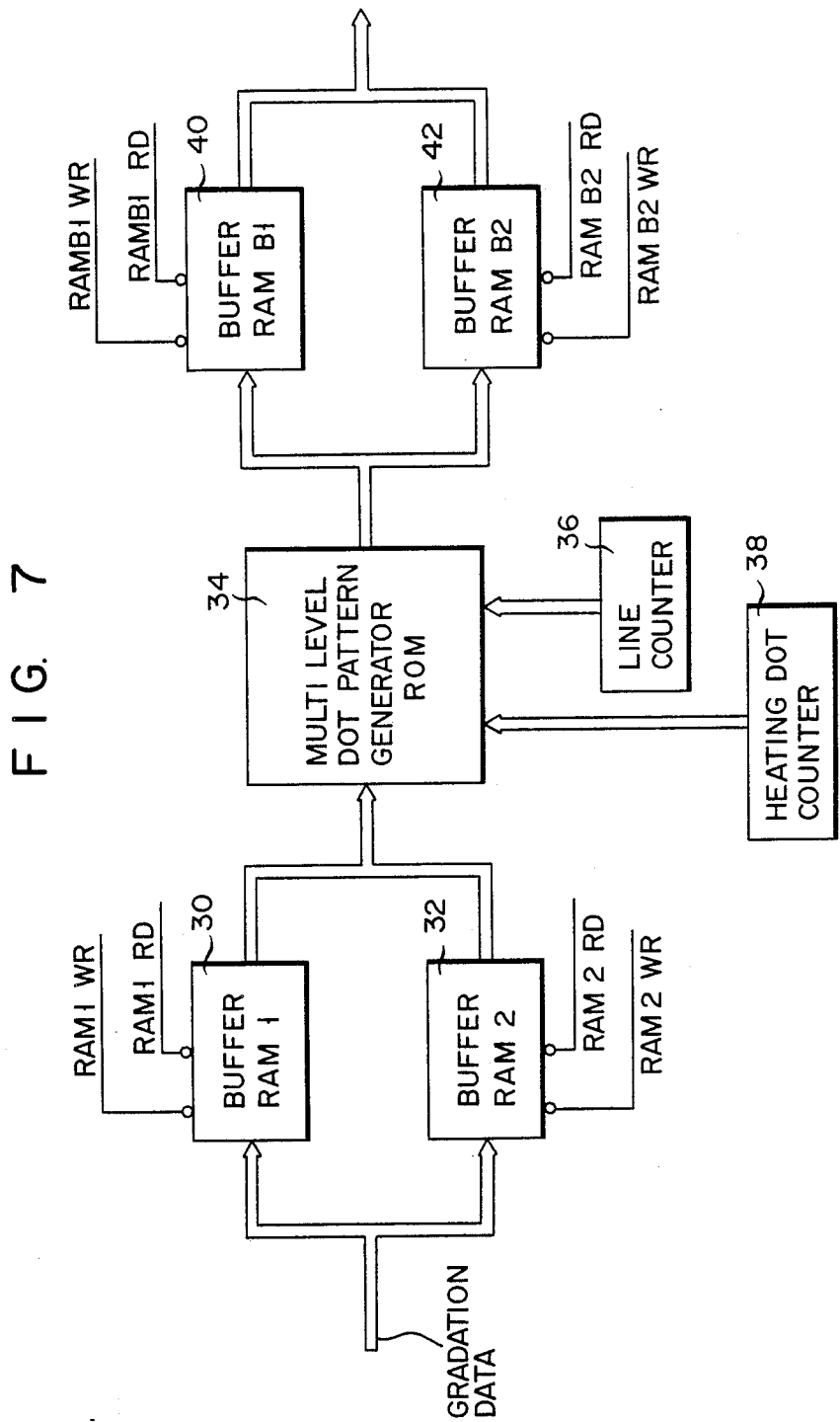

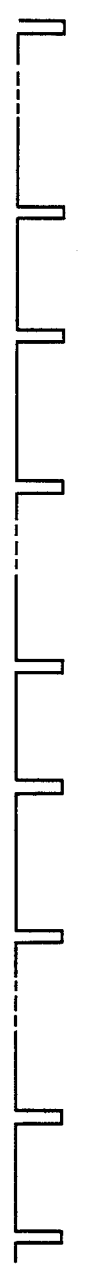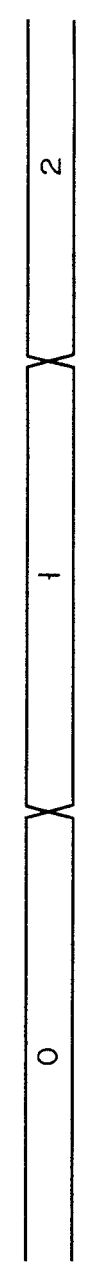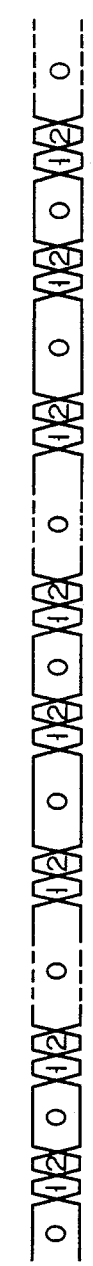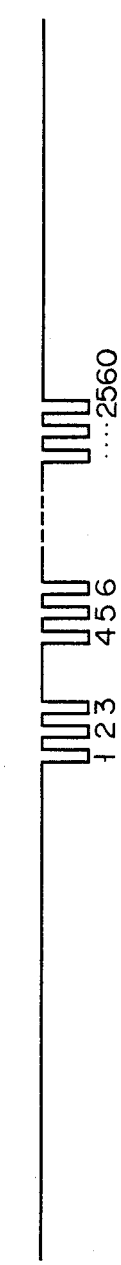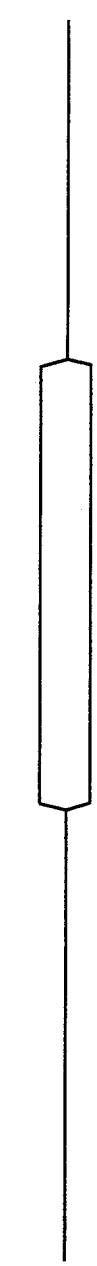
FIG. 8A (RAM1 RD)
FIG. 8B (LATCH)
FIG. 8C (RAM B1 WR)
FIG. 8D (LINE)
FIG. 8E (BIT)
FIG. 8F (RAM B2 WR)
FIG. 8G (RAM B1 RD)
FIG. 8H (RAM B2 RD)

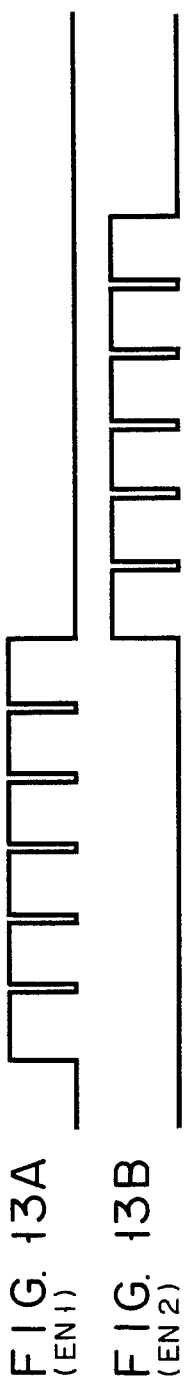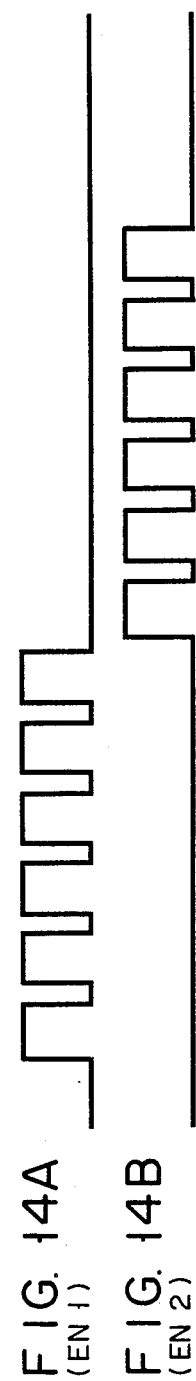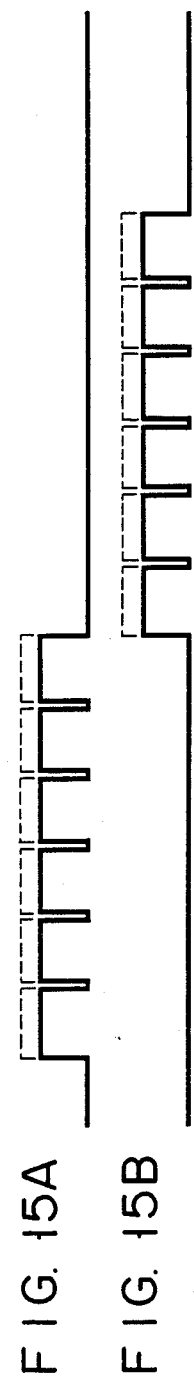
F I G. 13A (EN1)
F I G. 13B (EN2)
F I G. 14A (EN1)
F I G. 14B (EN2)
F I G. 15A
F I G. 15B

FIG. 21

| HALF-TONE GRADATION LEVEL | MULTI LEVEL DOT PATTERN |
|---|---|
| 0 ~ 11 | |
| 12 ~ 23 | |
| 24 ~ 38 | |

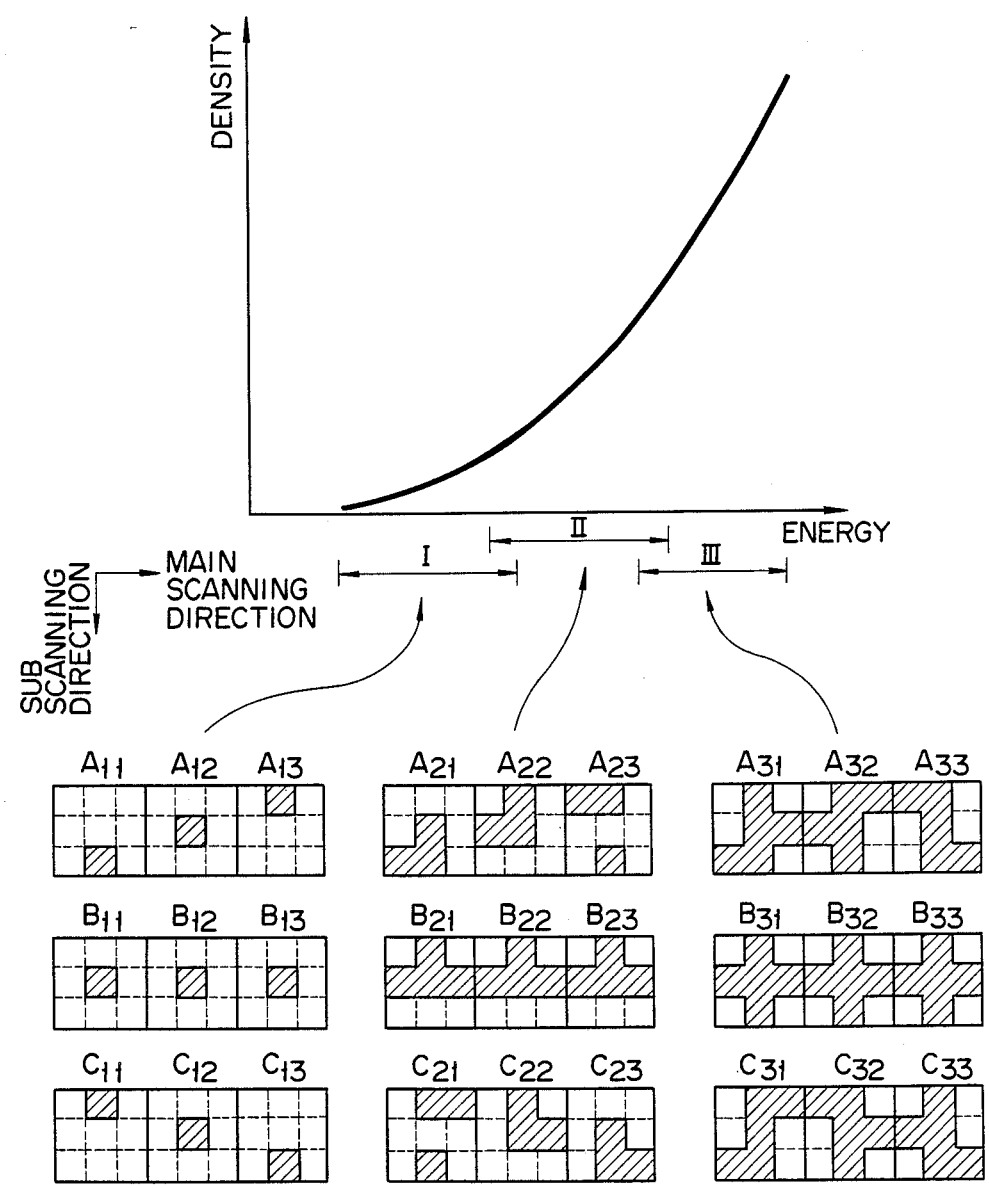
F I G. 42

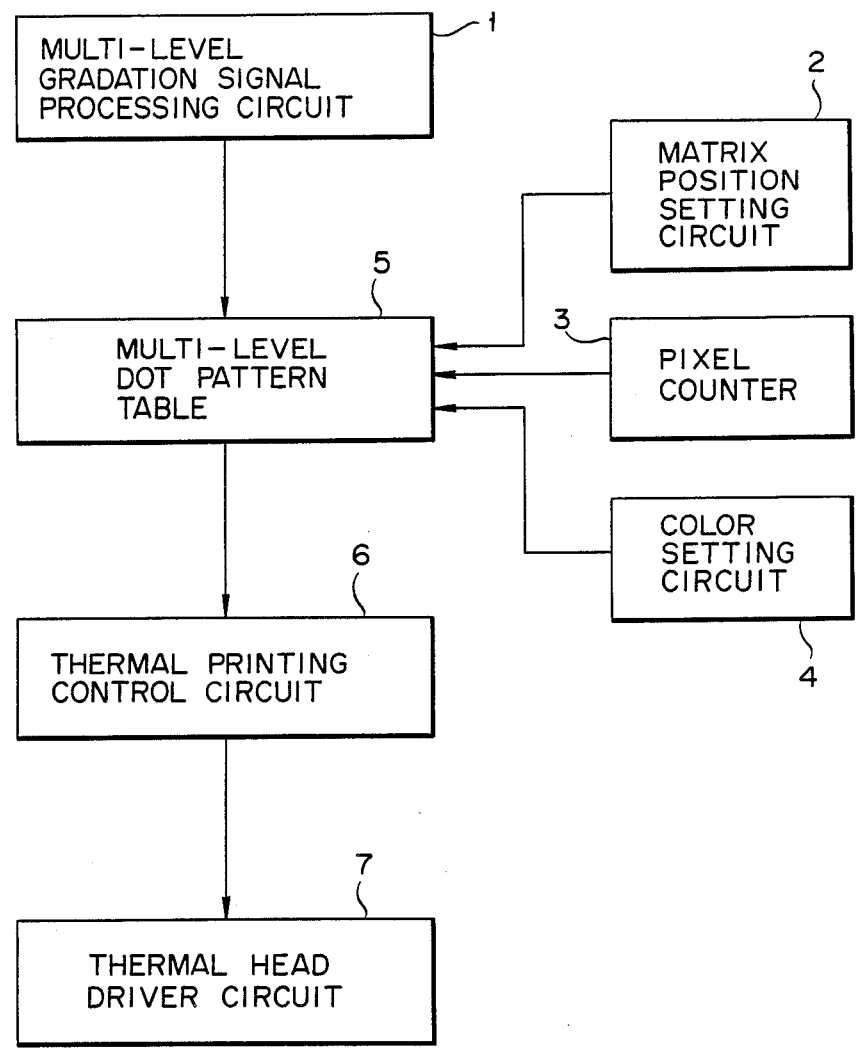
F I G. 45

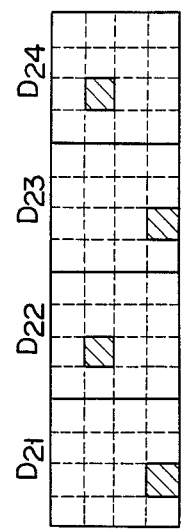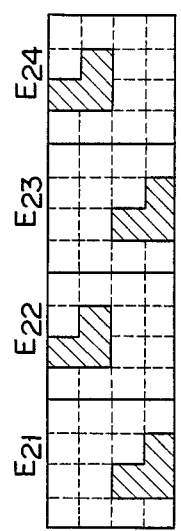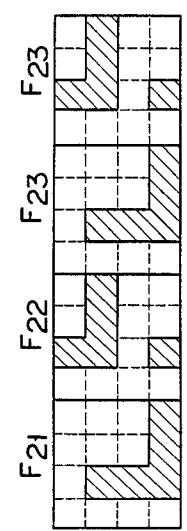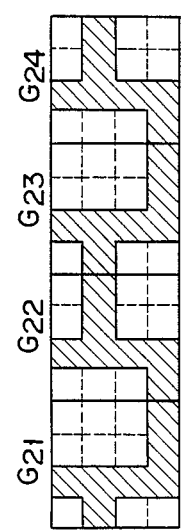
FIG. 46B
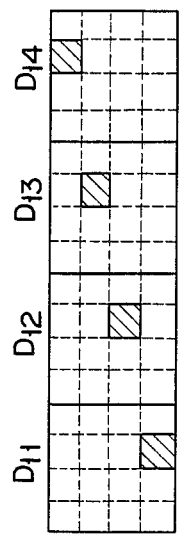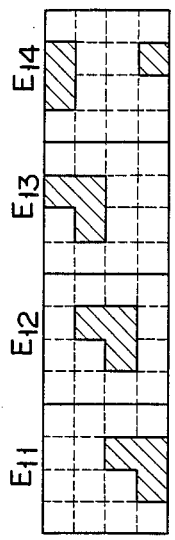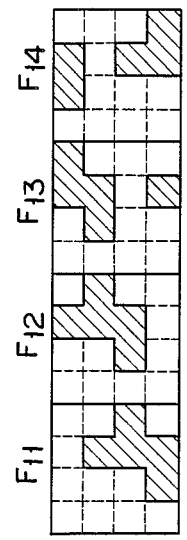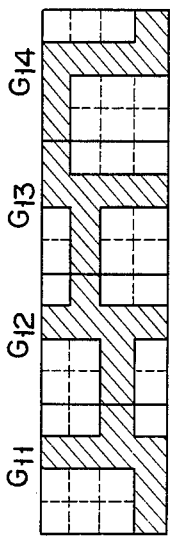
FIG. 46A

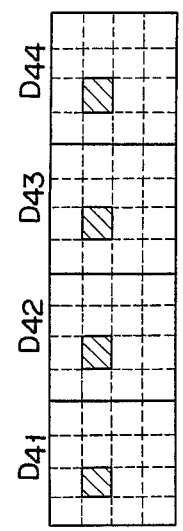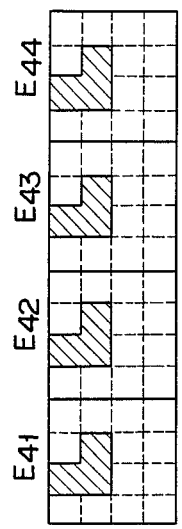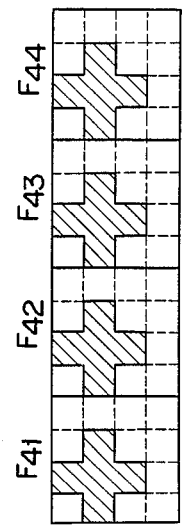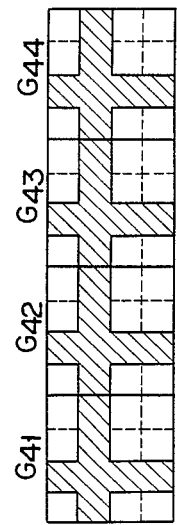
FIG. 46D
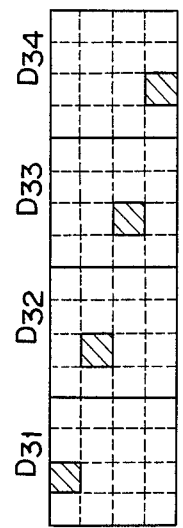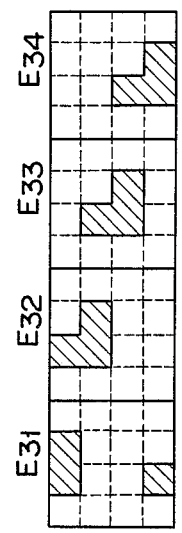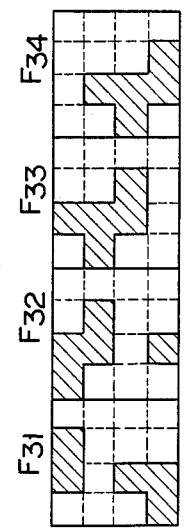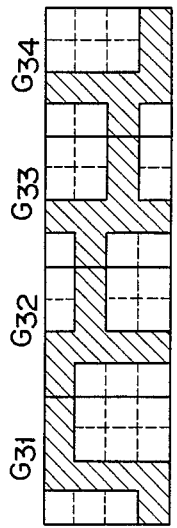
FIG. 46C

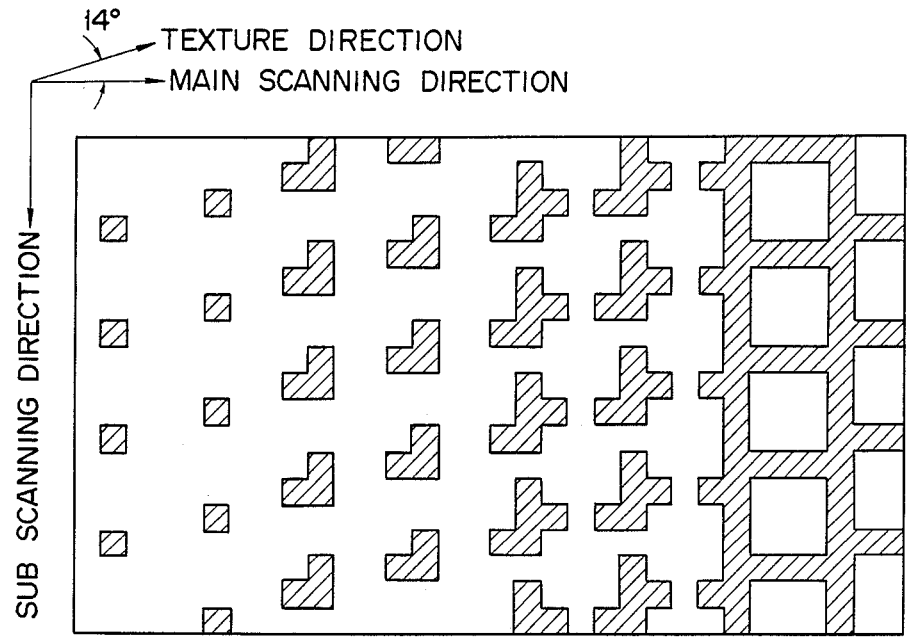
F I G. 47A
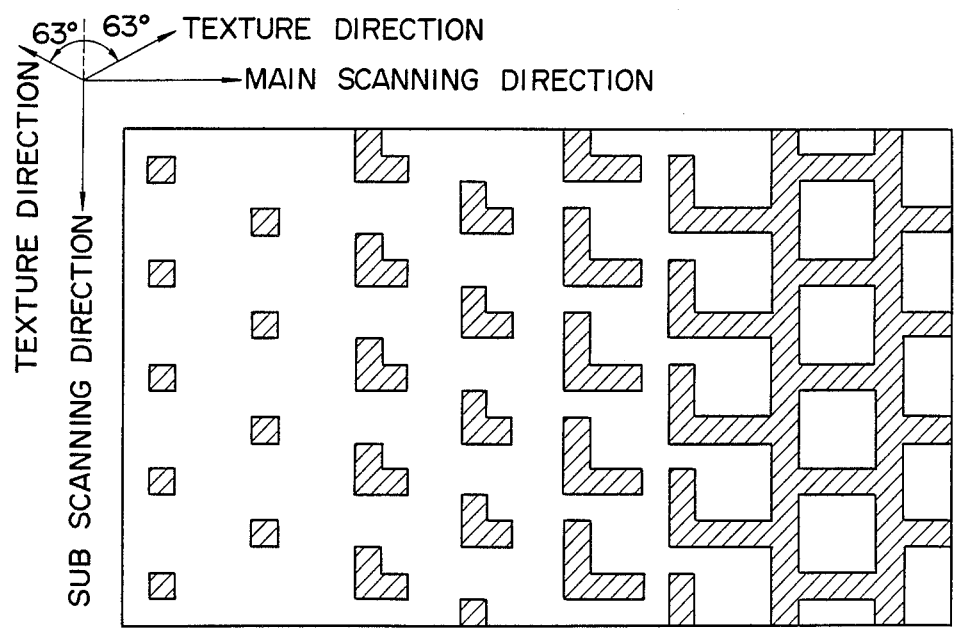
F I G. 47B

COLOR IMAGE PRINTING APPARATUS

CROSS-REFERENCE TO THE RELATED APPLICATION

This application is a continuation-in-part application of Ser. No. 821,954, "Thermal transfer printing apparatus" filed Jan. 24, 1986, now U.S. Pat. No. 4,724,446.

BACKGROUND OF THE INVENTION

The present invention relates to a halftone image printing device, and, more particularly, to a halftone image printing device in which a pixel is formed by a plurality of dots in a matrix form, and can be printed in a halftone mode, or with gradation or gray levels.

In a halftone image printing device, a thermal head (printing head) is urged against printing paper through an ink film (normally having a ribbon-shape), and an ink on the ink film is melted by heat generated when heating resistors constituting the thermal head are energized. Thus, the melted ink is transferred to the printing paper so as to form a dot image corresponding to the energized resistors. In this apparatus, each dot can only be binary-controlled as to whether or not the ink is transferred. Therefore, in order to print a halftone image such as a picture, a so-called binary area modulation method is generally adopted. In this method, a pixel must correspond to a plurality of dots in a matrix form. The number of dots which are energized and subjected to ink transferring, however, changes in accordance with the density of a pixel. A DITHER method, a micro-font method or the like are well known as binary area modulation methods.

However, the number of levels able to be represented by this area modulation method is limited. When a pixel has an n×n dot matrix configuration, the number of levels expressed is $n^2+1$, including 0 level (the level of the printing paper). For example, in the case of a 4×4 dot matrix, 17 levels are provided. In general, a color image requires a resolution of 4 dots/mm or higher, and each color component requires 64 gray levels or more. In order to satisfy these requirements with the above-mentioned area modulation method, a pixel must be configured by an 8×8 dot matrix, and a thermal head having a resolution of 32 dots/mm or higher is needed. Although a thermal head having a resolution of 16 dots/mm has been developed, it is difficult to realize one having a resolution of 32 dots/mm or higher. For this reason, in this area modulation method, requirements for the number of gray levels and resolution cannot be satisfied, and it is impossible to perform halftone printing having a gradation that in both smooth and fine.

The above description is made on monochromatic image printing. However, a full-color image can be printed by superposing images of a plurality of (generally three or four colors) color components. More specifically, inks of a plurality of colors are transferred in a superposed manner in amounts corresponding to the densities of the respective color components for each pixel. Then, dots of the respective colors in densities corresponding to the densities of the respective colors are superposed and formed as a single pixel on a printing sheet. In this case, when the transfer positions of the dots of the respective colors are misregistered, the hue is greatly changed. Therefore, in order to obtain a printed image with a stable hue, the transfer positions of the respective color inks must be correctly controlled.

However, it is considerably difficult to correctly position the transfer positions of the respective color inks when mechanical errors of the printer and high resolution are considered. As a result, conventionally, the reproduced hue is not stable because of the adverse influence of variations in relative position of the printer head and the printing sheet.

Such a mechanical error of the printer causes a slight skew, that is, rotation of the texture direction (the direction of a continuous line which the printed dots appear to form) of the printing dots of the respective color inks, thereby causing color moiré by the printed dot patterns of the respective color inks. More specifically, since dots are printed in a lattice-like manner, when the lattice directions of the respective colors are misregistered, dot arrays intersect at positions different from the original positions. These intersections are cyclically aligned, and moiré fringes are formed.

SUMMARY OF THE INVENTION

It is an object of the present invention to provide a color image recording apparatus which can provide a stable hue even if the positions of the printed dots of the respective colors are misregistered by a mechanical error and which can prevent degradation in the image quality of the printed image due to moiré fringes.

The color image printing apparatus of the present invention comprises a dot printing head for printing dots of at least two colors, and a printing control circuit for controlling the dot printing head so as to print only a predetermined dot corresponding to the density of each pixel of each color in a dot matrix corresponding to one pixel. The position of the printed dot in the dot matrix is determined such that the texture directions of the printed dots that are generated when the pixels are aligned in a two-dimensional manner are different in units of colors.

BRIEF DESCRIPTION OF THE DRAWINGS

FIGS. 4A to 4C are views showing multilevel dot patterns, in respective density ranges, used for driving a printing head in a second embodiment;

FIG. 5 is a graph showing the relationship between energy supplied and an optical density of a pixel formed when the printing head is driven in accordance with the multilevel dot patterns shown in FIGS. 4A to 4C;

FIG. 6 is a table showing the relationship between the energy supplied to the printing head in the second embodiment and the halftone gradation level of the pixel formed;

FIG. 7 is a block diagram showing a multilevel dot pattern generator shown in detail in FIG. 1;

FIGS. 8A to 8H are timing charts showing an operation of the multilevel dot pattern generator shown in FIG. 7;

FIGS. 13A and 13B are signal waveform charts showing an energy amount supplied to a head when the thermal head is at a normal temperature;

FIGS. 14A and 14B are signal waveform charts indicating that energy supplied to the thermal head at a high temperature can be decreased by decreasing a pulse width to compare with that at a normal temperature;

FIGS. 15A and 15B are signal waveform charts indicating that energy supplied to the thermal head at a high temperature can be decreased by decreasing an amplitude of a signal to compare with that at a normal temperature;

FIG. 21 is a table showing the relationship between energy supplied to a printing head used in the third embodiment and a halftone gradation level of the pixel formed;

FIG. 42 shows dot patterns of respective colors of respective densities used in pixel printing in a seventh embodiment;

FIG. 45 is a block diagram of the seventh embodiment;

FIGS. 46A to 46D show dot patterns of respective colors of respective densities used in pixel printing in an eighth embodiment; and FIGS. 47A to 47D show textures of printed dots of the respective colors when an image is printed using the dot patterns shown in FIGS. 46A to 46D.

DETAILED DESCRIPTION OF THE PREFERRED EMBODIMENT

A halftone image printing device according to an embodiment of the present invention will be described with reference to the accompanying drawings.

A principle of the present invention will first be described. As described above, in a halftone image printing device, a pixel corresponds to m×n dots in a matrix form (a dot is the minimum unit of a heating member constituting a printing head and capable of transferring an ink). The density of each pixel corresponds to the total amount of ink transferred in a matrix dot region corresponding to each pixel. Only when the amount of heat from a head exceeds a certain threshold level is an ink transferred to paper; otherwise, no transfer is performed. Conventionally, energy supplied to a head is a constant value higher than the threshold level, and the amount of ink transferred per dot is constant, through control, irrespective of the heat pile-up of the head. However, the present invention is based on the fact that the degree of heat of each heating member is proportional to the area of the dot formed. Thus, a specific dot is selected irrespective of density, and energy supplied to the selected specific dot is changed in accordance with density so as to control the degree of heat generated by this dot, thereby changing the total amount of ink transferred per pixel in accordance with the density.

Figure 1:
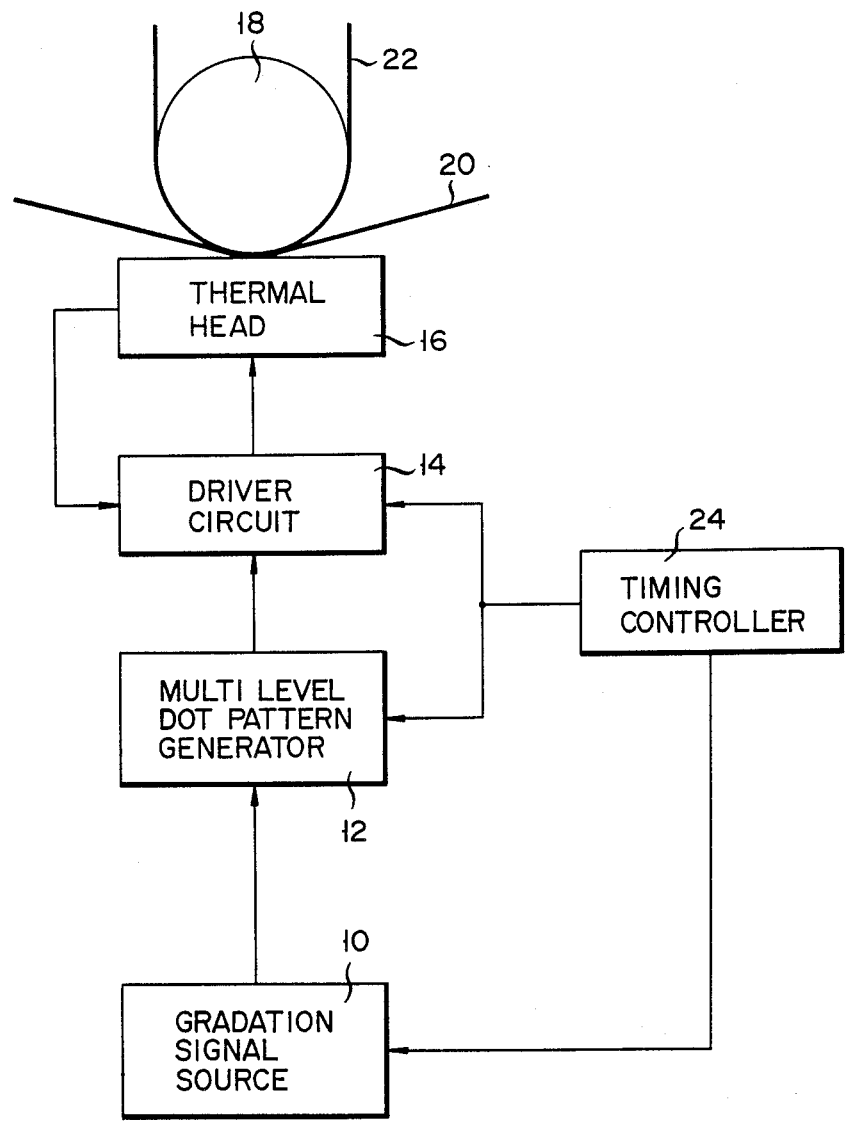
FIG. 1 is a block diagram showing a halftone image printing device apparatus according to a first embodiment of the present invention.

FIG. 1 is a block diagram showing an arrangement of a halftone image printing device according to a first embodiment of the present invention. An output from a gradation signal source 10 such as a memory is supplied to a multilevel dot pattern generator 12. Note that a gradation signal indicates the gray level of each pixel. The generator 12 generates a predetermined dot pattern for each pixel. Note that a pixel has an m×n dot matrix configuration, and a multilevel dot pattern constituted by specific dot therein is generated. That is, heating members corresponding to dots in this dot pattern are energized, the energization level (energy supply level) of each dot being controlled by the gradation signal. The thermal head 16 melts an ink while pressing printing paper 22 against the platen roller 18 through an ink ribbon 20, thereby transferring the ink onto the paper 22. A timing controller 24 for controlling various timings is connected to the gradation signal source 10, the multilevel dot pattern generator 12 and a driver circuit 14.

Figures 2A, 2B, 2C:
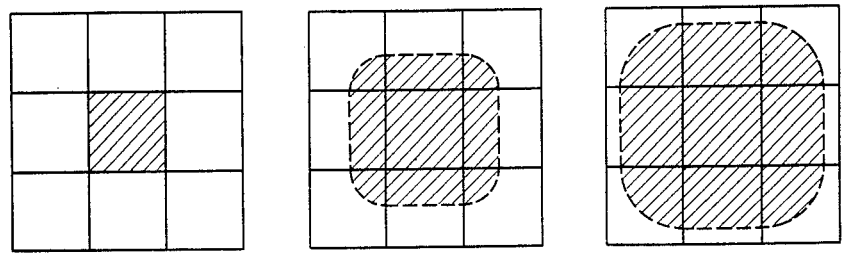
FIGS. 2A to 2C are views showing the relationship between energy supplied to a printing head and the shape of a pixel formed to explain a principle of the first embodiment.

The operation of the first embodiment will be described. Note that, for the sake of simplicity, the generator 12 constitutes a pixel of a 3×3 dot matrix configuration, and generates a discrete dot pattern ("discrete" will be used as well as "single" hereinafter) of one dot at a central portion thereof. Energy supplied to each heating member is proportional to the amount of ink transferred to the printing paper. When a heating member of the head is energized at a low level, i.e., in the case of a low density level, a dot having a size corresponding to the heating member is formed on the printing paper, as shown in FIG. 2A. When the heating member of the head is energized at a medium level, i.e., in the case of a medium density level, a dot slightly larger than the size of the heating member is formed on the printing paper, as shown in FIG. 2B. When the heating member of the head is energized at a high level, i.e., in the case of a high density level, a dot considerably larger than the size of the heating member is formed on the printing paper, as shown in FIG. 2C.

Figure 3:
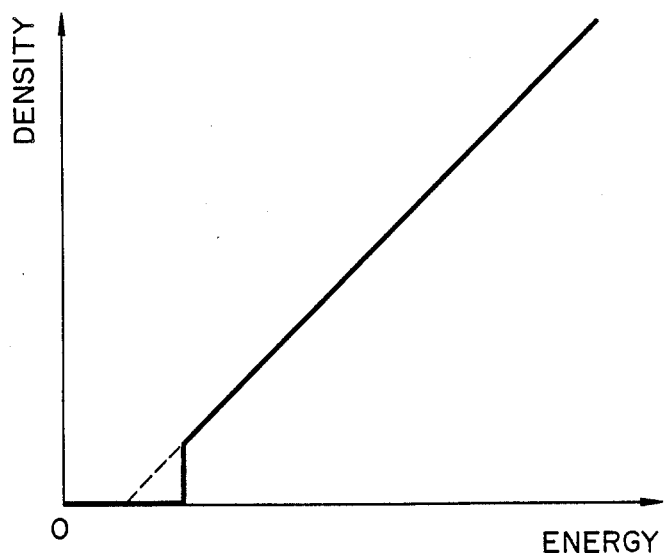
FIG. 3 is a graph showing the relationship between the energy supplied to the printing head in the first embodiment and an optical density of the pixel formed.

For this reason, the energy supply level of the heating member and the optical density of a pixel can be controlled as shown in FIG. 3. When the energy supply level is smaller and lower than the threshold energy level required for the optimal transfer of ink, it is uncertain whether or not ink transfer has been performed. Therefore, since the optical density is also uncertain, a characteristic curve is indicated by a broken line.

According to the first embodiment, the energization level of the thermal head is determined in accordance with the gradation signal, and, as a result, a proper amount of ink corresponding to the density is transferred to the printing paper, thus printing each pixel in a halftone mode.

Note that in the first embodiment, only a discrete dot in 3×3 dots is used so as to provide halftone printing in accordance with a change in the energy supply level of the specific dot. However, a density may not satisfactorily be controlled by only the change in the energy supply level of the specific dot, and an embodiment solving this problem will be described hereinafter.

In a second embodiment in which the above problem is solved, the total optical density range is divided into three ranges, with specific dot patterns being assigned to respective density ranges. A block diagram of the second embodiment is substantially the same as that of the first embodiment shown in FIG. 1, except that the generator 12 constitutes a pixel of a 3×3 dot matrix, and generates a dot pattern (discrete dot patter) constituted of one dot at an upper left corner, as shown in FIG. 4A, in a low density range; a dot pattern (stripe pattern) constituted by three dots included in a leftmost column, as shown in FIG. 4B, in a medium density range; and a dot pattern (L-shaped dot pattern) constituted by five L-shaped dots included, in a high density range, in the leftmost column of the lowermost row. Note that the vertical and lateral directions of each pattern correspond to a vertical movement and/or subscanning direction of the printing paper, and a lateral head heating member alignment and/or main scanning direction, respectively. The energy supply level of the heating member is varied in each pattern in accordance with a gradation signal, as in the first embodiment. In the low density range, the size (diameter) of a dot pattern transferred to the printing paper is changed in accordance with a change in the energy supply level of the heating member, thus also changing the density. In the medium density range, the size (width) of a stripe pattern transferred to the printing paper is changed in accordance with the change in the energy supply level of the heating member, thus also changing the density. In the high density range, an area of a 2×2 dot white portion other than an L-shape is changed in accordance with the change in the energy supply level of the heating member. In this case, the optical density ranges which can be indicated by changing the energy supply level of the heating member, partially overlap each other. A lower curve in FIG. 5 indicates characteristics of the discrete dot pattern of FIG. 4A, a middle curve in FIG. 5 indicates characteristics of the stripe pattern of FIG. 4B, and an upper curve in FIG. 5 indicates characteristics of the L-shaped pattern of FIG. 4C.

FIG. 6 shows an energy supply level of each dot corresponding to each halftone gradation level. In the second embodiment, the overall density is divided into 31 levels, the discrete dot pattern represents 0 to 4 halftone gradation levels (optical density), the stripe pattern represents 5 to 14 halftone gradation levels, and the L-shaped pattern represents 15 to 30 halftone gradation levels. In this manner, according to the second embodiment, a pixel of a 3×3 dot matrix can provide 31 levels. In a conventional area modulation methods such as a DITHER method, a pixel of a 3×3 dot matrix can provide only 10 levels. Therefore, the number of gradation levels can be greatly increased in the present invention.

Each dot pattern used in the second embodiment has the following advantages.

(1) The dot pattern including a stripe perpendicular to a dot array of the printing head (which is constituted by a heating member array aligned along a lateral direction of the printing paper) can print a smooth pattern. The predetermined dots are continuously energized, such that the gradient of heat-diffusion becomes steep and the edge of the printed pattern becomes stable.

(2) Since each dot pattern has a white portion of 2×2 dots or more, a portion to be whitened cannot be arbitrarily blackened, and stable gradation with less noise can be obtained. This performance was confirmed by a head having a resolution of up to 16 dots/mm.

(3) When an energy supply level is changed in the same dot pattern, the printing density increases linearly with respect to an increase in the average energy per dot. That is, the density can be controlled in an analog manner. If the number of control levels are enlarged, a large of gradation number can be obtained.

(4) In advantage (3), the higher the resolution of the printing head becomes, the weaker a pattern dependency becomes. Therefore, density characteristics cannot differ from their respective patterns. The energy supply level also increases linearly with respect to an optical density, even if the dot pattern is changed.

The second embodiment will be described in more detail hereinafter. Assume, for the sake of description, that a pixel has 3×3 dots. FIG. 7 is a block diagram showing the multilevel dot pattern generator 12 in detail. Gradation data (8 bits) from the gradation signal source 10 is supplied to a buffer (RAM1) 30 and a buffer (RAM2) 32. This is to complete data supply from the signal source 10 by one operation per line. If the gradation data is not supplied to buffers 30 and 32, since the gradation data only gives one level to a pixel of 3×3 dots, the same gradation data from the signal source 10 must be supplied three times per every line. The buffers RAM1 and RAM2 have a capacity of 8 bits×854. Note that the printing head is a 2,560-dot head having 2,560 heating members aligned along the main scanning direction (since the printing paper is moved along the vertical direction in this case, the main scanning direction corresponds to the lateral direction of the paper). Since a pixel has 3×3 dots, bits of the smallest integer larger than 2,560/3, i.e., 854 bits are required. The two buffers 30 and 32 allow for high speed printing. Data in the first line (three lines in practice, because a pixel has 3×3 dots) is written into the buffer RAM1, and the data in the next line is written into the buffer RAM2. Data in the following lines are alternately written into the buffers RAM1 and RAM2. Thus, while data is written into one buffer, data can be read out from the other buffer. When data write of one line data in the buffer RAM 1 or RAM2 is completed, the buffer RAM1 or RAM2 is set in a standby state. When printing of 3 line data constituting a pixel is completed, a data readout signal RAM1RD or RAM2RD is generated, and the data at the second line is read out from the buffer RAM1 or RAM2. Thereafter, this operation is repeated until printing for one page is completed (in the case of color printing, until printing for one color is completed). Assuming that a printing cycle is 2 msec/line, it requires 6 msec to read out data of one pixel line.

The same dot pattern is generated three times from the buffers RAM1 and RAM2. In response to the signal RAM1RD, data in the buffer RAM1 is read out, and the readout data is supplied to a multilevel dot pattern generator ROM 34. (The generator 34 can comprise a RAM.) Multilevel dot pattern data (6 bits) in the ROM 34, indicated by the input data, an output from a line counter 36 (2 bits) and an output from a heating dot counter 38 is serially generated, and is stored in a buffer (RAMB1) 40 and a buffer (RAMB2) 42. This data indicates the energy supplied to each heating member of the printing head. The counters 36 and 38 repeatedly generate data "0", "1" and "2", indicating which data is to be read out from the 3×3 dot matrix. The buffer (RAMB1) 40 and the buffer (RAMB2) 42 have a capacity of 6 bits×2,560, and are provided for two lines for the urpose of high speed driving. Data for one line (854 words) is read out from the RAM1, and is converted into dot pattern data indicating an energization energy level. When all the data (2,560 words) are written in the RAMB1, the RAMB1 is switched to the standby state. During this operation, data is read out from the other RAMB2 so as to perform one line printing.

FIGS. 8A to 8H show the above operation as a timing chart.

Figure 9:
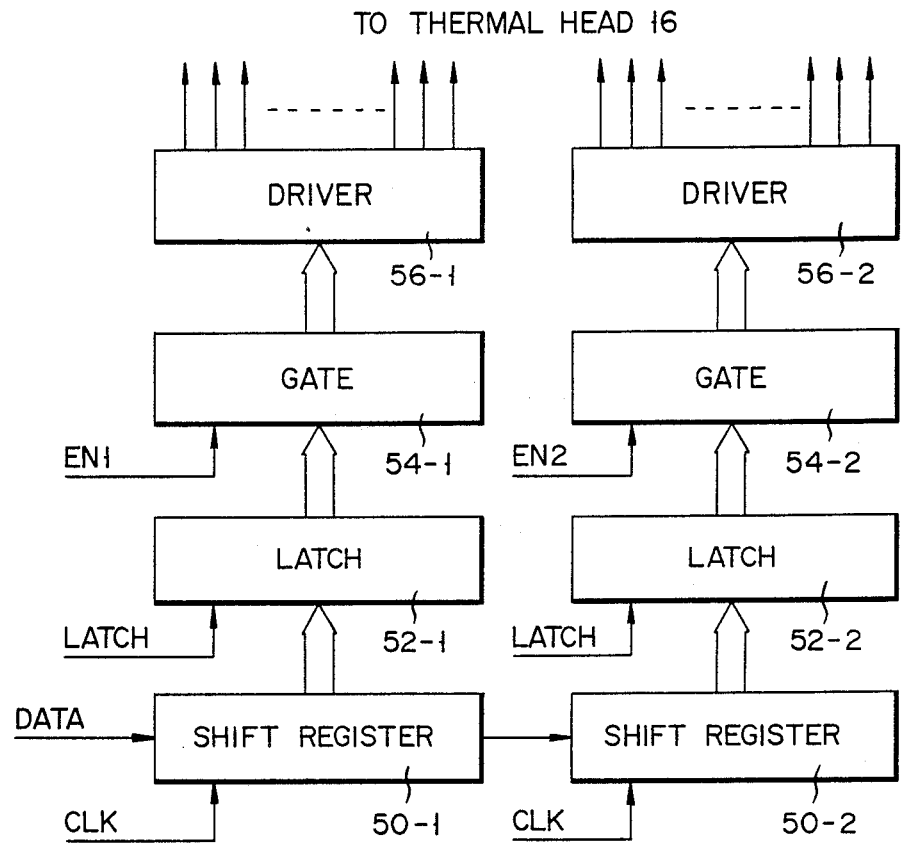
FIG. 9 is a block diagram showing a thermal head driver shown in FIG. 1.

FIG. 9 is a detailed block diagram of the driver 14 shown in FIG. 1. It should be noted that a thermal head 16 is driven by two phases, and has two identical circuits with suffix numbers 1 and 2. The data supplied from the generator 12 is supplied to a shift register 50-1, and the output from the register 50-1 is transferred to a shift register 50-2. The same clock signal is supplied to the registers 50-1 and 50-2. The outputs from the registers 50-1 and 50-2 are supplied to latches 52-1 and 52-2 in parallel. The latches 52-1 and 52-2 receive a common latch signal. The outputs from the latches 52-1 and 52-2 are supplied to gates 54-1 and 54-2, respectively. The gates 54-1 and 54-2 receive enable signals EN1 and EN2, respectively. The outputs from the gates 54-1 and 54-2 are supplied to the heating members in respective phases of the thermal head through drivers 56-1 and 56-2.

FIGS. 10A to 10G are timing charts showing the operation of this circuit. When 2,560 bit data is serially transferred six times within 2 msec, the transfer rate is about 8 Mbits/sec. On the other hand, a thermal head drive IC normally has a transfer rate of about 4 Mbits/sec. Therefore, parallel data input ports must be provided to the thermal head for high speed data transfer. In this embodiment, the thermal head has eight inputs. Therefore, data transfer of 2,560/8=320 bits is performed.

Figure 11:
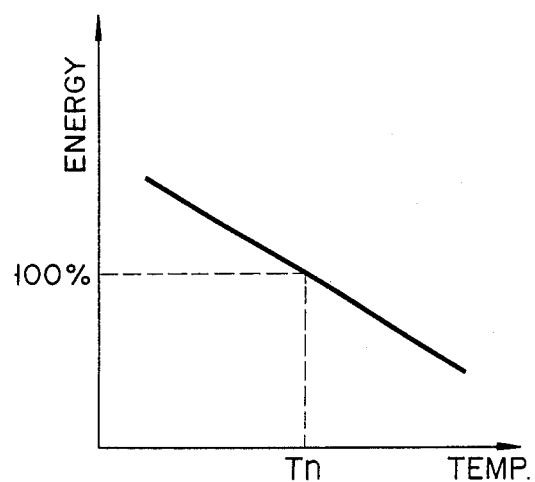
FIG. 11 is a graph showing the relationship between energy supplied to a thermal head and a temperature thereof.
Figure 12:
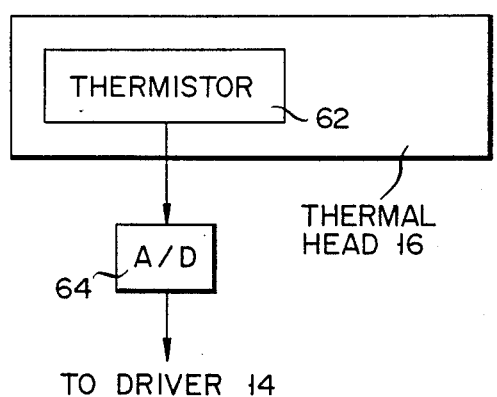
FIG. 12 is a block diagram showing a thermal head shown in detail in FIG. 1.

In this embodiment, as shown in FIG. 1, heat from the thermal head 16 is detected, and the detection data is fed back to the driver circuit 14. Since an ink amount differs depending upon the temperature of the head 16, even at the same energy level, the energy level must be controlled by heat from the head 16. For this reason, assuming that, as shown in FIG. 11, the energy level at a normal temperature (Tn) is 100%, the energy level is decreased as temperature increases. Therefore, even if the temperature is changed, a constant amount of ink can be transferred. In this embodiment, as shown in FIG. 12, the head 16 is connected to a thermistor 62, and the output therefrom is supplied to the driver 14 through an A/D converter 64.

Figure 10:
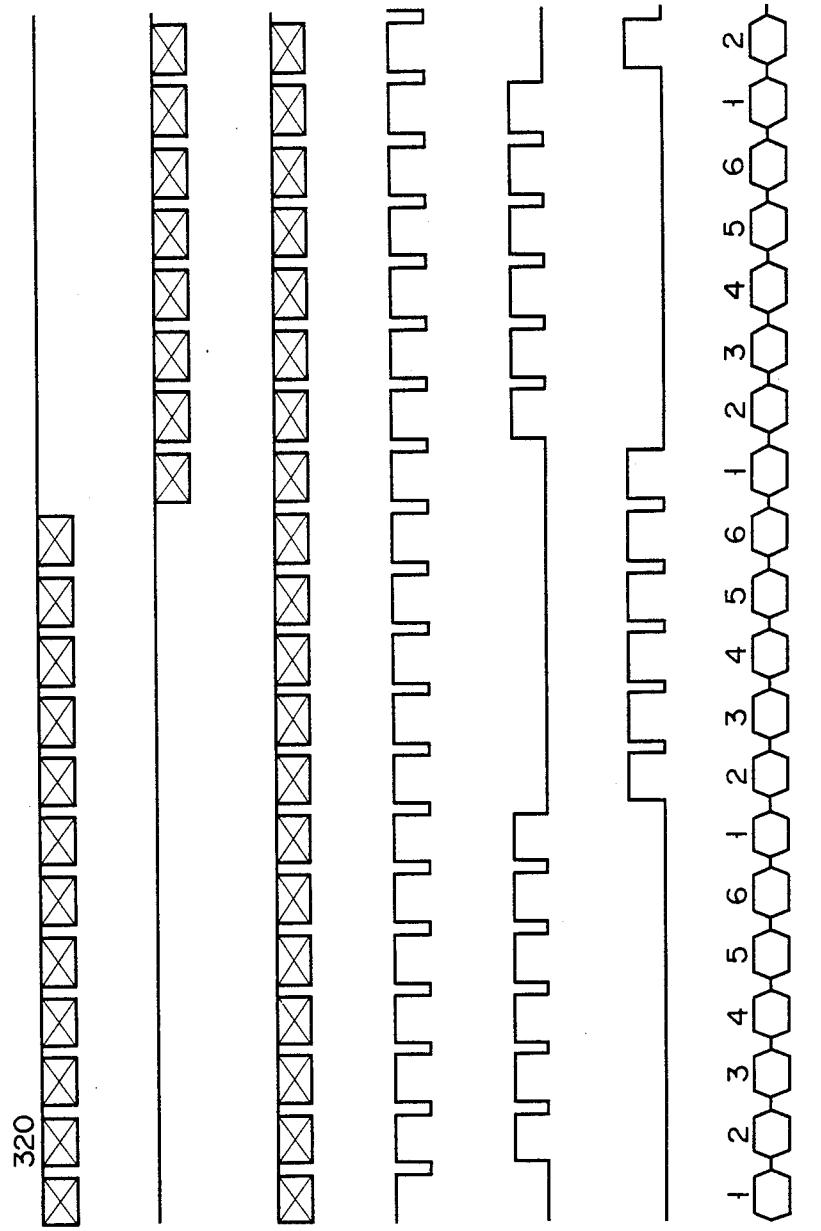
FIGS. 10A to 10G are timing charts showing an operation of the thermal head driver shown in FIG. 9.

The driver 14 exerts control, in accordance with the detected temperature value, in the following manner. As shown in FIGS. 9 and 10, energy supplied to the head 16 is controlled by the gates 54-1 and 54-2. For this reason, pulse widths of the enable signals EN1 and EN2 shown in FIGS. 13A and 13B and supplied to the gates 54-1 and 54-2, are decreased as shown in FIGS. 14A and 14B, respectively, thus serving to reduce the energy requirements. Alternatively, as shown in FIGS. 15A and 15B, when amplitudes of the output voltages from the drivers 56-1 and 56-2 are decreased, this too can decrease the energy requirements.

Another embodiment will be described in which selection of a dot pattern in each density range is altered. In a third embodiment, a dot pattern comprising a combination of L-shaped dot patterns is used in every density range. Effectiveness of the L-shaped pattern will be explained with reference to FIGS. 16A to 16C.

Figure 16A:
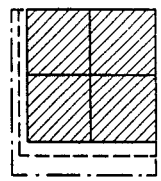
FIGS. 16A to 16C are views showing the effectiveness of a dot pattern used in a third embodiment.
Figure 16B:
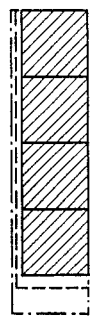
Figure 16C:
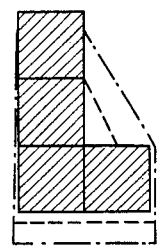

FIG. 16A shows a concentrated pattern used in a DITHER method, FIG. 16B shows a stripe pattern and FIG. 16C shows the L-shaped pattern according to the third embodiment. Each pattern has 4 dots. Broken lines and alternate long and short dashed lines respectively indicate the sizes of pixels formed when these patterns are energized so as to transfer an ink. Note that the alternate long and short dashed lines indicate cases having higher energy. In general, in high-speed thermal transfer printing, a pixel slightly expanded along the subscanning direction (the direction in which the printing paper moves; the vertical implied in the figure) is apt to be formed. Therefore, a pixel is expanded in accordance with the number of dots along the subscanning direction. in other words, if the same amount of energy is supplied, the dynamic range of gradation is widened. In addition, since a dot generally has a regular rectangular shape and is of small matrix size, e.g., the concentrated pattern shown in FIG. 16A, a bridge is formed between two adjacent dots when the energy level is increased, resulting in degradation in smoothness due to uneven density, and in image quality due to noise caused by the random generation of bridges. In contrast, in the L-shaped pattern shown in FIG. 16C, since the pixel is expanded within a region surrounded by dot arrays along the main scanning and subscanning directions, a wider dynamic range of gradation can be obtained as compared to the patterns shown in FIGS. 16A and 16B. This result is more notable in a pattern comprising a combination of L-shaped patterns than in a single L-shaped pattern.

Figure 17A:
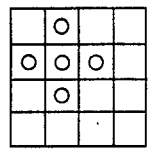
FIGS. 17A to 17F are views showing a dot pattern used in the third embodiment and the shape of a pixel formed thereby.
Figure 17C:
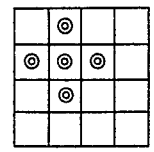
Figure 17E:
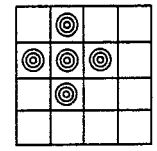
Figure 17B:
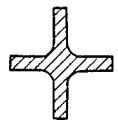
Figure 17D:
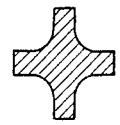
Figure 17F:
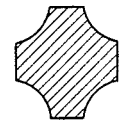

FIGS. 17A to 17F show the sizes of pixels when cross-shaped patterns, as a combination of L-shaped patterns arranged in a 4×4 dot matrix, and high, medium and low levels of energy are supplied to dots. FIG. 17A shows a case wherein low level energy is supplied to the dots, and FIG. 17B shows the resultant size of a pixel. FIG. 17C shows a case wherein medium level energy is supplied to the dogs, and FIG. 17D shows the resultant size of a pixel. FIG. 17E shows a case wherein high level energy is supplied to the dots, and FIG. 17F shows the resultant size of a pixel. In this manner, since the cross-shaped pattern includes four regions surrounded by dot arrays along the main and subscanning directions, the dynamic range of gradation can be widened.

Figure 18A:
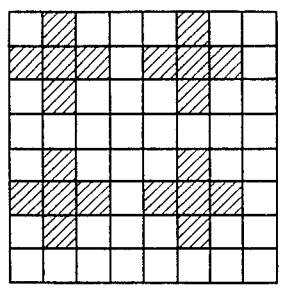
FIGS. 18A and 18B are views showing a pattern and the shape of continuous pixels when a plurality of dot patterns used in the third embodiment are continuously arranged.
Figure 18B:
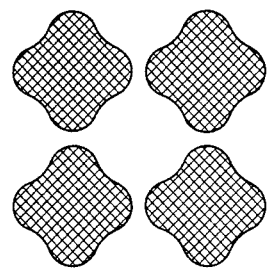

In the third embodiment, it is considered that adjacent patterns should have less, and preferably no dots contacting each other when each pattern is selected. When there are no dots contacting each other between two adjacent patterns, the following effect can be obtained. As shown in FIG. 18A, cross-shaped patterns having five dots are arranged in four adjacent 4×4 dot matrices. These patterns have not dots contacting each other. FIG. 18B shows a case wherein an ink is transferred using these patterns. Since the patterns are spaced apart from each other, even if the energy level is changed, the respective patterns are kept separate. As the energy level is increased, the pixels are enlarged. However, since non-energized dots are present between adjacent patterns, attachment of an ink and ink transfer to the printing paper are unlikely to occur at such non-energized dots when peeling the ink ribbon from the printing paper. Thus, independency of the patterns can be maintained. In this case, since the narrowest portions of the cross-shaped patterns are adjacent to each other, they serve to maintain the independency of the patterns. Even if the respective patterns contact each other, when the narrowest portions of the patterns contact each other, the center of the cross-shaped pattern is furthest from the contacting portion. Thus, pixels are expanded from the center of the dot matrix in accordance with the energy level, and non-transferred ink portions are concentrically contracted. Thus, if the energy level is increased, a satisfactory image quality can be maintained. In general, when adjacent patterns contact each other, an increase in the ink transfer area is observed in the contacting portion in accordance with pixel forming energy, this increase occurring abruptly. For this reason, linearity of gradation in accordance with an increase in pixel forming energy is often impaired.

Figure 19A:
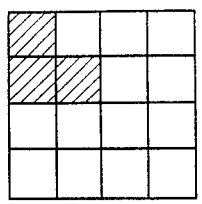
FIGS. 19A to 19N are views showing examples of dot patterns used in the third embodiment.
Figure 19B:
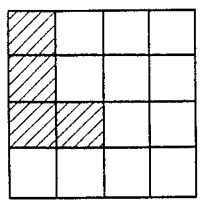
Figure 19C:
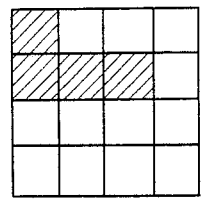
Figure 19D:
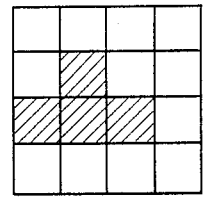
Figure 19E:
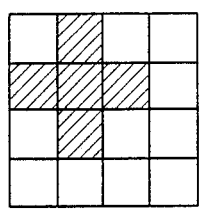
Figure 19F:
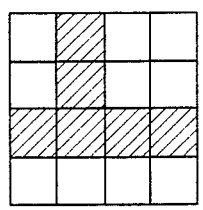
Figure 19G:
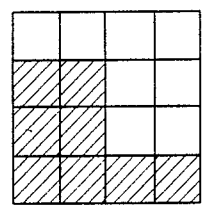
Figure 19H:
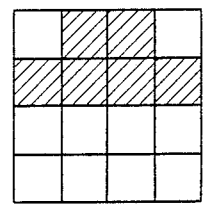
Figure 19I:
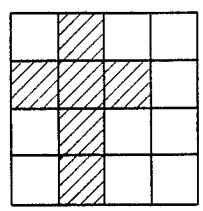
Figure 19J:
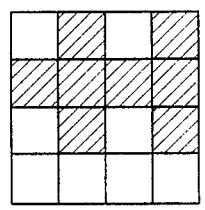
Figure 19K:
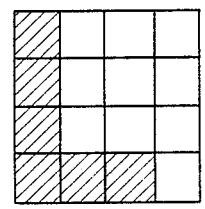
Figure 19L:
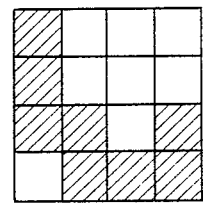
Figure 19M:
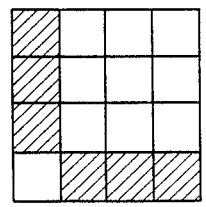
Figure 19N:
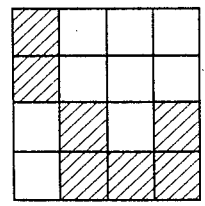
Figure 20:
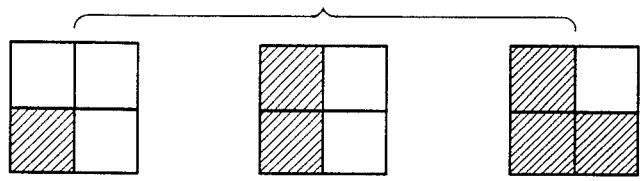
FIG. 20 is a view showing a dot pattern of the third embodiment when a pixel has a 2×2 matrix size.

FIGS. 19A to 19N show examples of dot patterns used in the third embodiment in the order from lower gradation levels to higher gradation levels. Note that although each pattern has 4×4 dots, it needs to have 2×2 dots or more. However, in order to print a halftone image at high resolution, m and n of an m×n matrix size satisfy, preferably $2 \leq m \leq n \leq 6$. FIG. 20 shows patterns when m=n=2.

FIG. 21 shows halftone gradation levels of the third embodiment and energy supply levels for dots of dot patterns. In this case, the L-shaped pattern shown in FIG. 19A is assigned to the low density range, the cross-shaped pattern shown in FIG. 19E is assigned to the middle density range and the combined L-shaped pattern shown in FIG. 19L is assigned to the high density range, thereby providing 39 levels.

Figure 22:
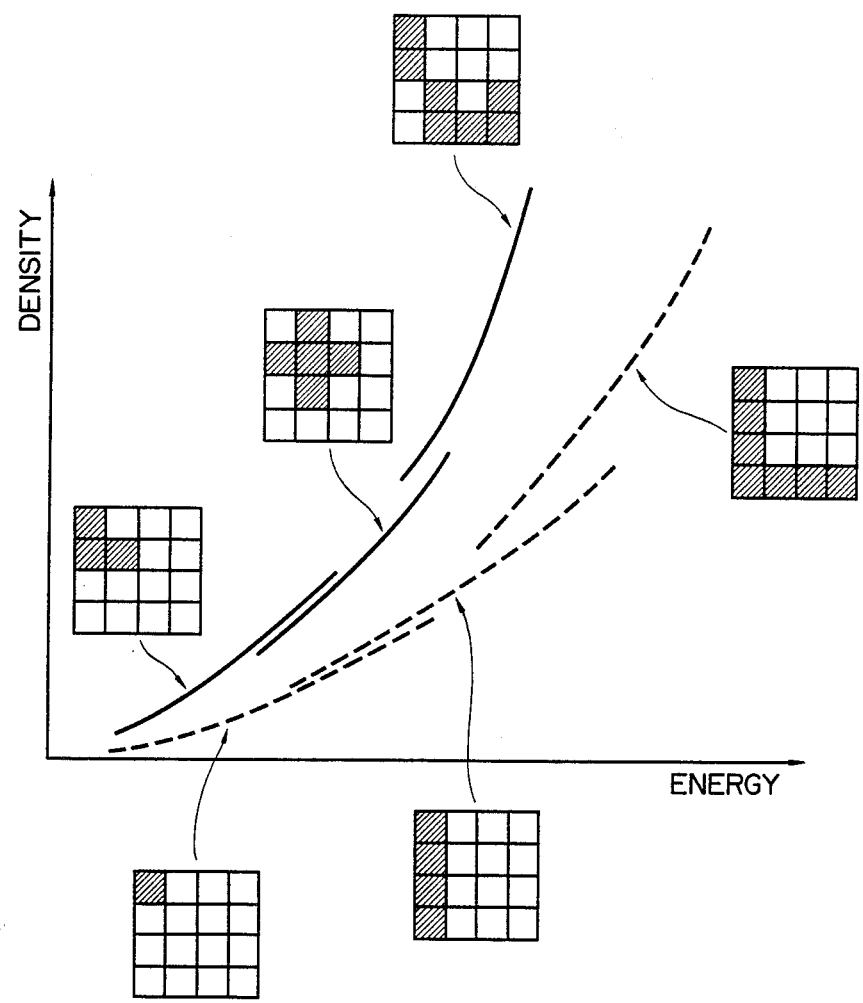
FIG. 22 is a graph showing the relationship between energy supplied and an optical density of a pixel formed when the printing head is driven using the multilevel dot pattern of the third embodiment.
Figure 23A:
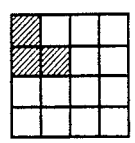
FIGS. 23A to 23D are views showing dot patterns compared to indicate the effectiveness of a fourth embodiment.
Figure 23B:
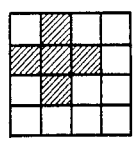
Figure 24A:
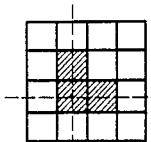
FIGS. 24A to 24D are views showing multilevel dot patterns, in respective density ranges, used for driving a printing head in the fourth embodiment.
Figure 24B:
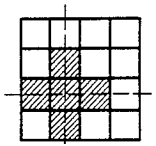
Figure 23C:
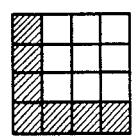
Figure 23D:
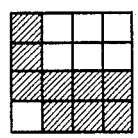
Figure 24C:
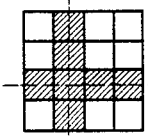
Figure 24D:
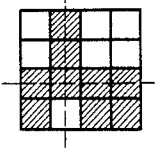

FIG. 22 is a graph for comparing the density characteristics of the multilevel pixels printed in the third embodiment and another previous embodiment (second embodiment). The characteristics of the third embodiment are indicated by the solid curve, and those of the other embodiment are indicated by the broken curve. In the third embodiment, as can be seen from this graph, the dynamic range of gradation can be widened, and a change in density can be obtained with good linearity. In addition, good image quality with no density irregularity can be obtained in the overall density range.

A fourth embodiment will be described hereinafter. In the fourth embodiment, dot patterns in each dot range are selected so that positions of the dot arrays forming each dot pattern are the same (or in the same phase). That is, the pattern is determined so that the dot array forming the pattern is located at the same position in at least one of the main and subscanning directions. This is because pixels can be stably formed since the heat pile-up of the dot can be effectively utilized, and, in each pattern, the dynamic range of gradation is wide and linearity is high.

Figure 25A:
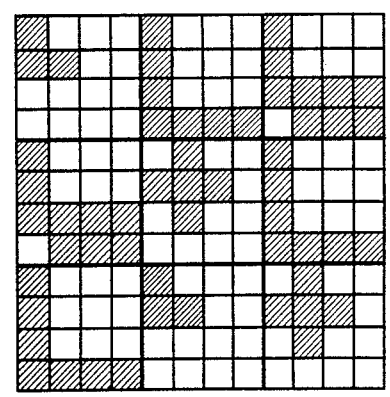
FIGS. 25A and 25B are views showing a pattern when a plurality of dot patterns are continuously arranged in comparison with conventional dot pattern.
Figure 25B:
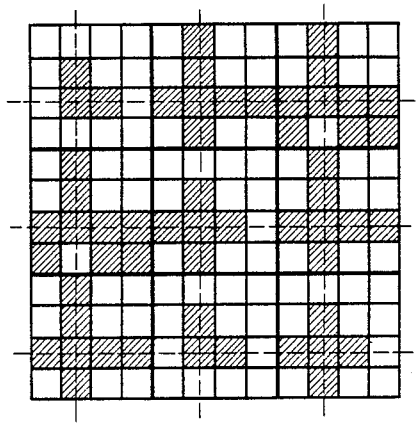
Figure 26A:
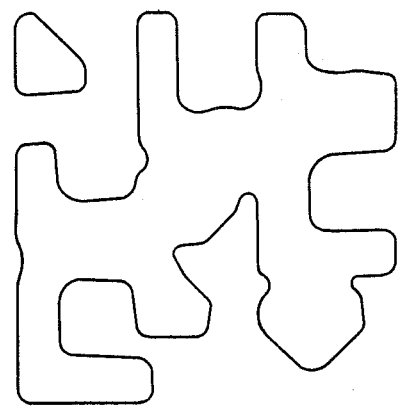
FIGS. 26A and 26B are views showing the shape of a pixel formed when the thermal head is driven using the patterns shown in FIGS. 25A and 25B.
Figure 26B:
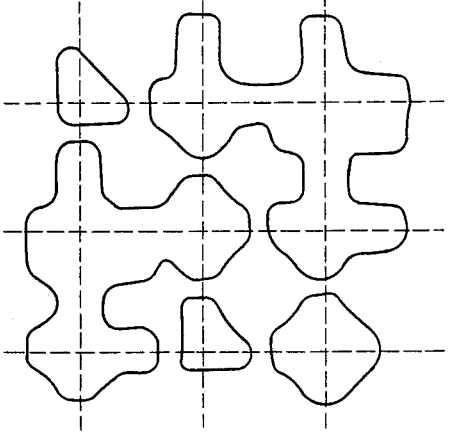
Figure 27A:
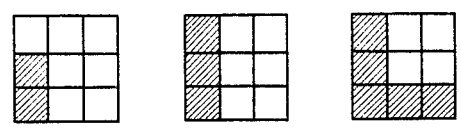
FIGS. 27A to 27D are views showing another example of multilevel dot patterns, in respective density ranges, used for driving the printing head in the fourth embodiment.
Figure 27B:
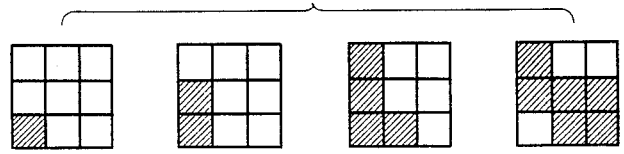
Figure 27C:
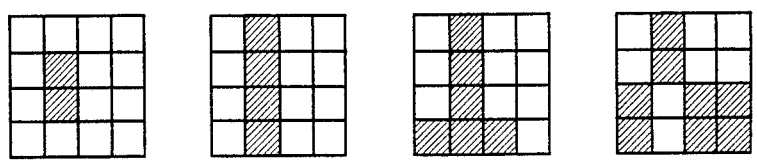
Figure 27D:
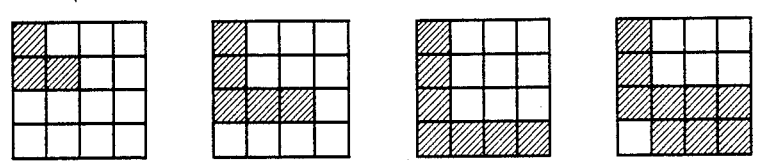
Figure 28A:
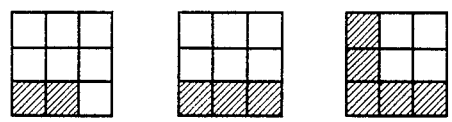
FIGS. 28A to 28D are views showing still another example of multilevel dot patterns, in respective density ranges, used for driving the printing head in the fourth embodiment.
Figure 28B:
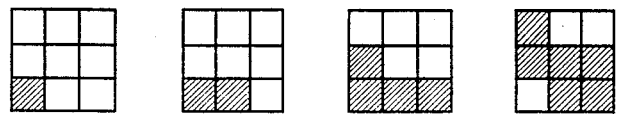
Figure 28C:
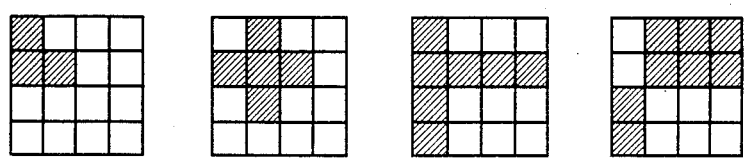
Figure 28D:
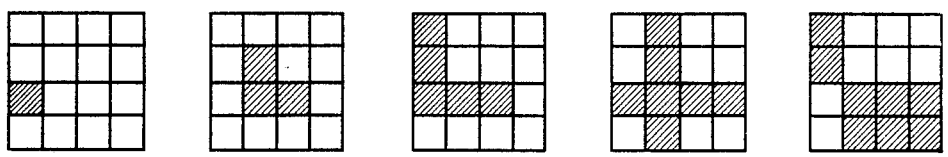
Figure 29A:
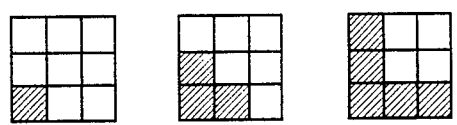
FIGS. 29A to 29D are views showing still another example of multilevel dot patterns, in respective density ranges, used for driving the printing head in the fourth embodiment.
Figure 29B:
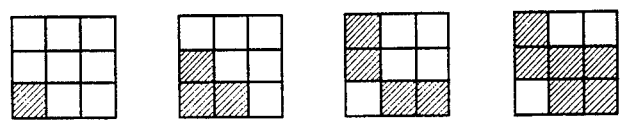
Figure 29C:
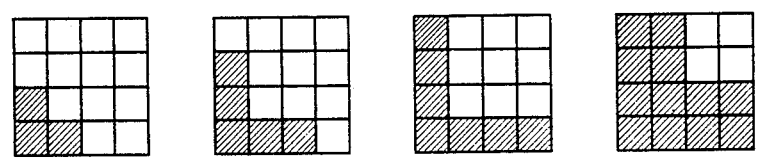
Figure 29D:
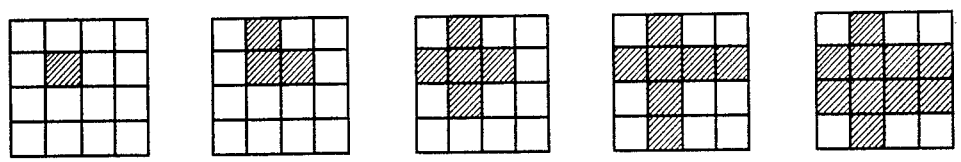

The patterns of the fourth embodiment will be described with reference to FIGS. 23A to 23D, and FIGS. 24A to 24D for the purpose of comparison with conventional patterns. FIGS. 23A to 23D, show the conventional patterns, and, FIGS. 24A to 24D show the dot patterns of the fourth embodiment. In this case, the overall density range is divided into four ranges. FIG. 25A is a view showing a dot pattern in which the conventional patterns shown in FIGS. 23A to 23D are continuously formed. FIG. 25B is a view showing a dot pattern in which the dot patterns of the fourth embodiment shown in FIGS. 24A to 24D are continuously formed. As shown in FIGS. 23A to 23D, when positions of the crossing points of the dot arrays in the patterns are different from each other, and when different patterns are formed adjacent to each other as shown in FIG. 25A, each dot may either make contact with the adjacent dot array, or be greatly separated therefrom. Therefore, the printing state becomes that as shown in FIG. 26A. In this state, printed and blank portions are aligned irregularly, and image quality is degraded by unstable gradation production caused by noise due to uneven density or a bridge irregularly generated between dot arrays of adjacent pixels. In contrast to this, according to the fourth embodiment, as indicated by broken lines in FIGS. 24A to 24D, since the phases of dot arrays in all the patterns coincide with each other in the main scanning and subscanning directions, heating centers also coincide with each other. As shown in FIG. 25B, even when different patterns are formed adjacent to each other, all the dot arrays can be regularly aligned. For this reason, since the printed and blank portions are aligned regularly in the printed state shown in FIG. 26B, image quality will not be degraded by unstable gradation reproduction caused by noise due to uneven density or a bridge irregularly generated between dot arrays of adjacent pixels. Therefore, the gradation reproduction characteristics can be greatly improved. When pixels are regularly aligned in a matrix form on the overall printing screen and the gradation reproduction characteristics are good even in a portion in which different patterns are formed adjacent to each other, high image quality printing can be achieved with less noise as compared to a conventional method.

FIGS. 27A to 27D, FIGS. 28A to 28D and FIGS. 29A to 29D show various examples of the dot pattern of the fourth embodiment. These figures show combinations of patterns in the respective density ranges. In FIGS. 27A to 27D, positions of dot arrays coincide with each other along the main scanning direction (lateral direction in figures). In FIGS. 28A to 28D, positions of the dot arrays coincide with each other along the subscanning direction (vertical direction in figures). In FIGS. 29A to 29D, the positions of the dot arrays coincide along both the main scanning and subscanning directions.

In the case of a discrete dot pattern constituting a single dot, although a dot position can be arbitrary, if such a discrete dot is regarded as a dot array and is aligned along an extending line of a dot array in another pattern, a better effect is obtained.

Figure 30:
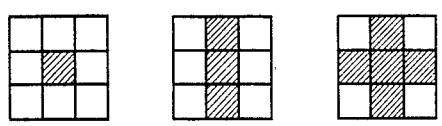
FIG. 30 is a view showing multilevel dot patterns used for driving a printing head in a fifth embodiment.
Figure 31:
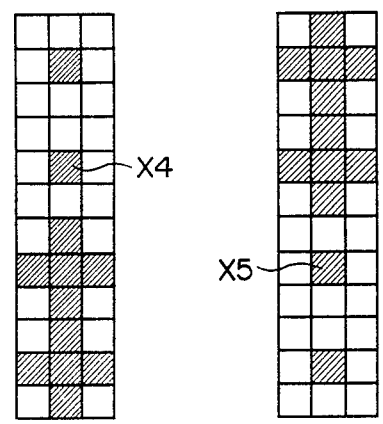
FIG. 31 is a view showing the shape of a pixel formed by driving the thermal head using the dot patterns shown in FIG. 30.
Figure 32:
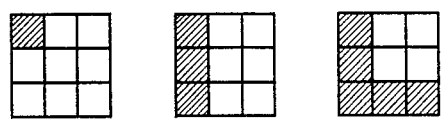
FIG. 32 is a view showing multilevel dot patterns compared to indicate the effectiveness of the fifth embodiment.
Figure 33:
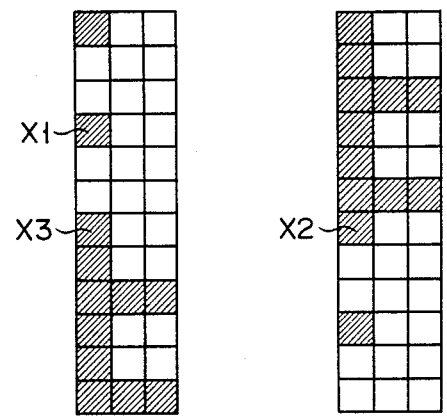
FIG. 33 is a view showing the shape of a pixel formed by driving the thermal head using the dot patterns shown in FIG. 32.

A fifth embodiment will be described hereinafter. In the fifth embodiment, as shown in FIG. 30, the heating center of each pixel coincides with the center of a dot matrix, and the dot pattern is established so as to be rotation symmetrical (of 180 degrees) about the center of the dot matrix. Each pixel has a 3×3 dot matrix configuration. A discrete dot pattern having only a central dot is assigned to the low density range, as shown at the left side of FIG. 30. A stripe dot pattern having 3 dots included in the center line is assigned to the middle density range, as shown in the central portion of FIG. 30. A cross-shaped dot pattern having 5 dots included in central vertical and lateral arrays is assigned to the high density range, as shown at the right of FIG. 30. With these patterns, as shown in FIG. 31, when the gradation patterns are switched from a high to a low level or vice versa, the dot pattern nearest the switched pattern remains the same. In contrast, in the case of the use of the non-symmetrical pattern of rotation shown in FIG. 32, when the gradation patterns are switched from a high to a low level or vice versa, the dot pattern nearest the switched pattern changes, as shown in FIG. 33. In the case of FIG. 33, the dot X2 does not have the cooling interval of a blank dot; consequently the dot X2 is printed as a large dot due to a heat pile up and has a size different from the dot X1 which has a cooling interval. Furthermore, since the dot X3 has a sufficient cooling interval, it is printed as a small dot. In the case of the figure to the left in FIG. 33, the density at a boundary becomes lower than a predetermined density, and, in the case of the figure to the right, the density at a boundary becomes higher than the predetermined density, i.e., exhibits a kind of edge emphasis characteristic resulting in discontinuity in the density. In contrast to this, in the case of FIG. 31, since dots X4 and X5 have the cooling interval of blank dots, they can be printed as dots having substantially the same size.

Figure 34:
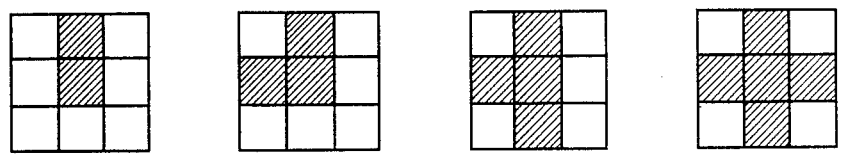
FIG. 34 is a view showing another example of multilevel dot patterns, in respective density ranges, used for driving the printing head in the fifth embodiment.
Figure 35:
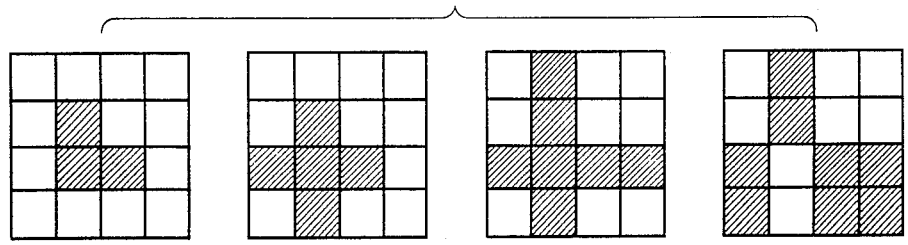
FIG. 35 is a view showing still another example of multilevel dot patterns, in respective density ranges, used for driving the printing head in the fifth embodiment.

FIGS. 34 and 35 are modifications of the dot patterns of the fifth embodiment.

Figure 36:
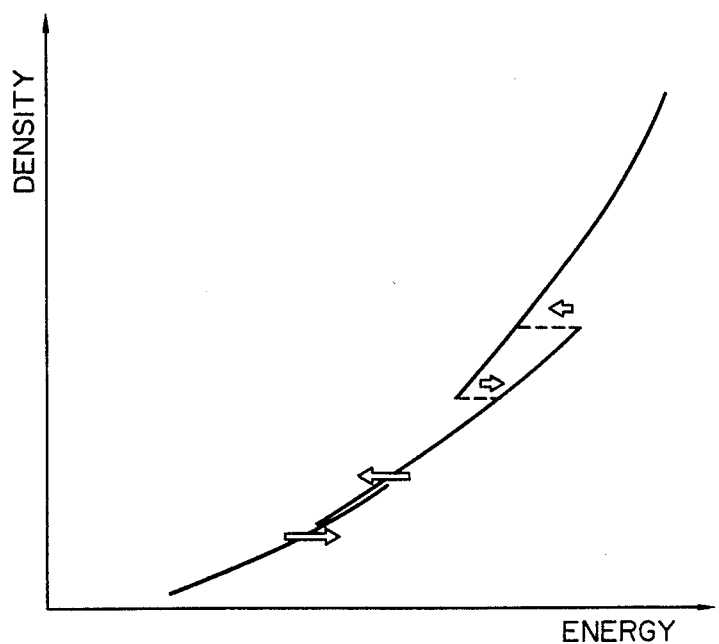
FIG. 36 is a graph showing characteristics of multilevel dot patterns, in respective density ranges, used for driving a printing head in a sixth embodiment.

A sixth embodiment will be described hereinafter. In this embodiment, as shown in FIG. 36, density ranges which are covered by respective dot patterns overlap, and the density level at which the dot patterns are switched are different in accordance with whether the density changes from a high to a low level or vice versa. In general, in the second to fifth embodiments, the dot patterns are selected in accordance with the density level and noise tends to be generated when the dot patterns are switched. For this reason, when the printing density is changed, the switching frequency of the dot patterns is preferably decreased as low as possible. In this embodiment, a changing direction of the density is detected, and when the density is changed from a high to a low level, a dot pattern which covers the high density range of the overlapping dot patterns is used. In contrast to this, when the density is changed from a low to a high level, a dot pattern which covers the low density range of the overlapping dot patterns is used. Thus, the switching frequency of the dot patterns can be reduced.

Figure 37:
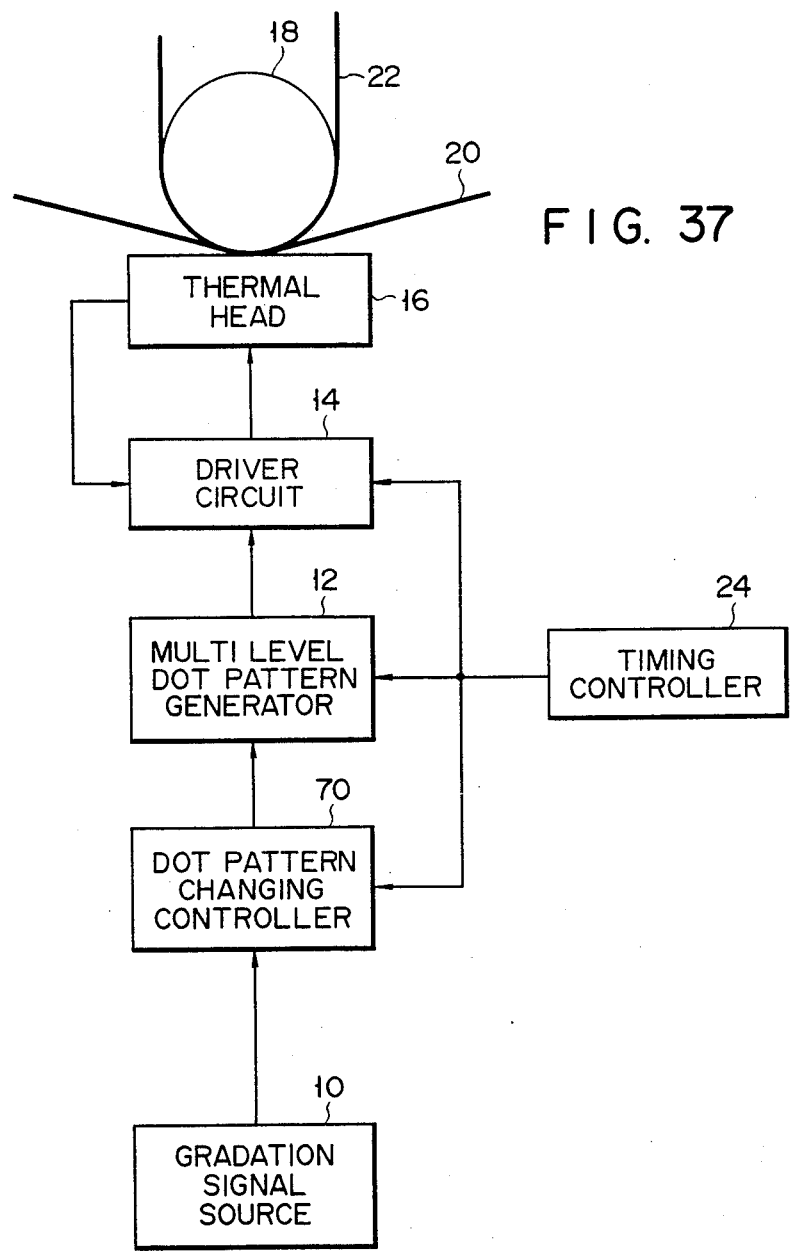
FIG. 37 is a block diagram showing an arrangement of the sixth embodiment.
Figure 38:
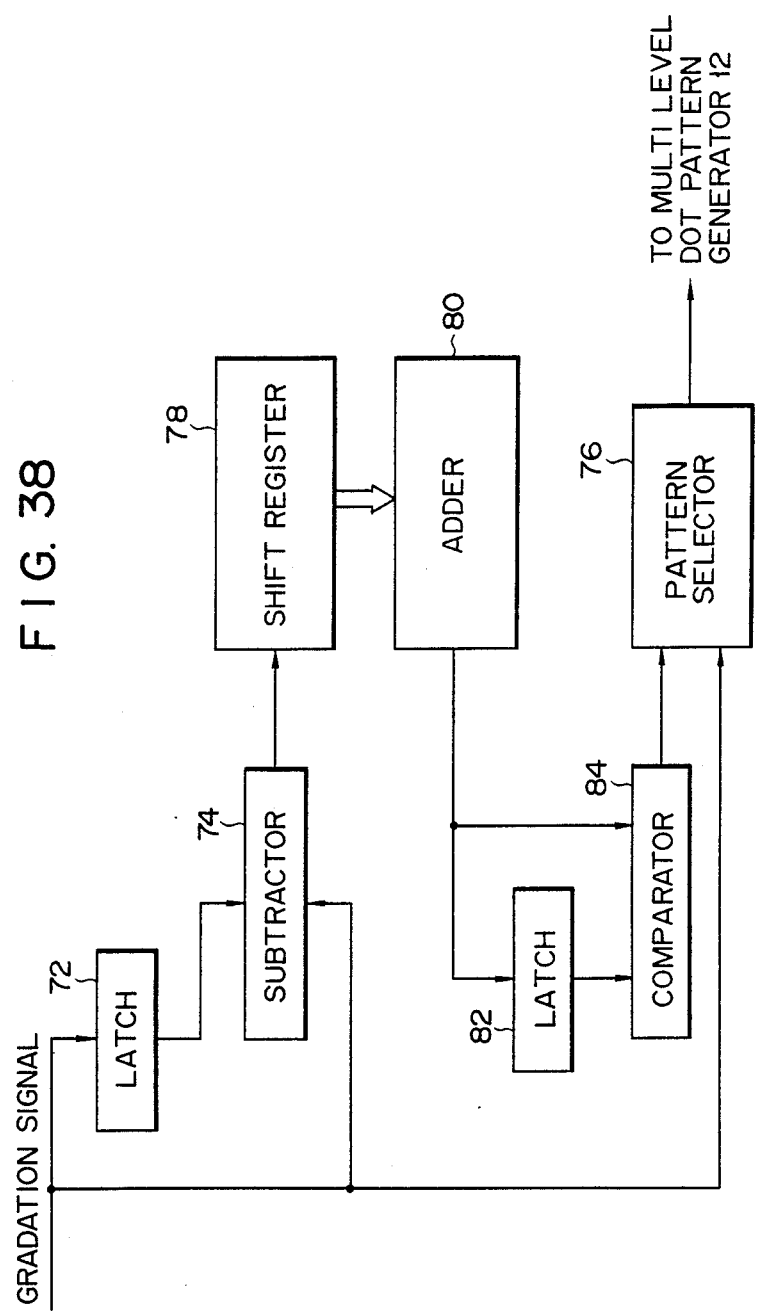
FIG. 38 is a block diagram showing a dot pattern changing controller of the sixth embodiment.
Figure 39:
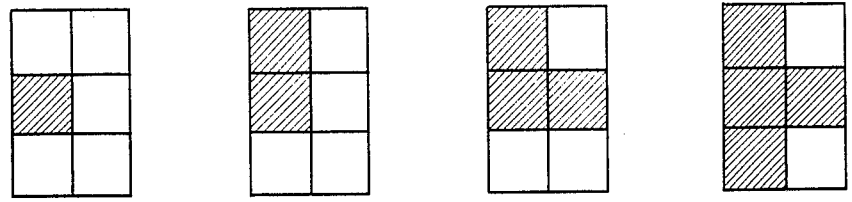
FIG. 39 is a view showing dot patterns when a pixel has a 2×3 dot matrix size.
Figure 40:
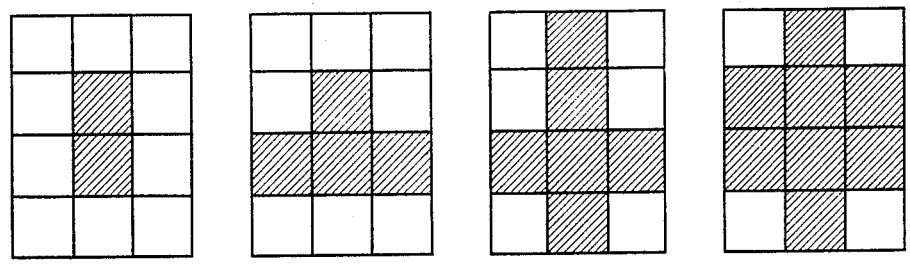
FIG. 40 is a view showing dot patterns when a pixel has a 3×4 dot matrix size.
Figure 41:
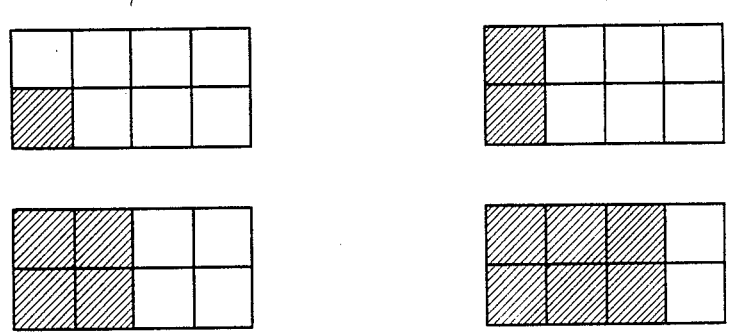
FIG. 41 is a view showing dot patterns when a pixel has a 4×2 dot matrix size.

FIG. 37 shows a block diagram of the sixth embodiment. This block diagram is substantially the same as that of FIG. 1 except that a dot pattern changing controller 70 is connected between the gradation signal source 10 and the multilevel dot pattern generator 12. FIG. 38 shows the controller 70 in more detail. The gradation signal from the signal source 10 is supplied to a latch 72 and to a first input terminal of a subtractor 74 and a pattern selector 76. The output from the latch 72 is supplied to a second input terminal of the subtractor 74. The subtractor 74 subtracts the output signal from the latch 72 from the signal from the signal source 10, and supplies the subtraction result to a shift register 78. The register 78 delays an input image signal for every pixel, and outputs from the respective stages are supplied to an adder 80. The output signal from the adder 80 is supplied to a latch 82, and is also supplied to a first input terminal of a comparator 84. The output from the latch 82 is supplied to a second input terminal of the comparator 84. The output from the comparator 84 is supplied to the pattern selector 76, and the output from the selector 76 is supplied to the generator 12.

With this circuit, a pixel signal delayed by one pixel by the latch 72 is subtracted from the signal from the signal source 10, and a change in density for each pixel can be detected. In order to detect a density change in the main scanning direction at equal intervals, an average value of a change in density between m pixels (m corresponds to the number of stages of the register 78) is obtained. The average value is stored in the latch 78 every m pixels, and a change in the average values is detected to be either positive or negative by the comparator 84. The output from the comparator 84 and the input gradation signal are supplied to the selector 76, and the selector 76 supplies a selection signal to the generator 12 so as to select a halftone dot pattern included in the characteristics of the low density component of two overlapping characteristics when the change in density is positive. When the change in density is negative, the selector 76 supplies a selection signal to the generator 12 so as to select a half-tone dot pattern included in characteristics of the high density component.

An embodiment of the invention performing color printing will be described.

FIG. 42 shows the principle of a seventh embodiment. In the seventh embodiment, an image is represented by pixel matrixes. Each pixel is printed by predetermined dots within a predetermined dot matrix. The pattern of a printed dots forming one pixel is defined as a dot pattern. The respective dots of the dot pattern are printed in densities corresponding to the densities of the pixels.

FIG. 42 shows dot patterns used in the seventh embodiment. In FIG. 42, each pixel corresponds to a 3×3 dot matrix. Color printing is performed by three-color component image printing in a superposed manner. Dot patterns $A_{ij}$, $B_{ij}$, and $C_{ij}$ (i,j=1 to 3) respectively indicate dot patterns of first, second, and third color-component images. Different dot patterns are not used for respective densities, but the entire range of density is divided into three density ranges, and different dot patterns are used for the respective ranges of total energy amounts injected into the thermal head corresponding to the respective density ranges. In other words, the first affix i (1 to 3) of the dot patterns $A_{ij}$, $B_{ij}$, and $C_{ij}$ indicates the injected energy amount range (I to III).

Note that three dot patterns are assigned to each single injected energy amount range. The three dot patterns are repeatedly used for every three pixels continuing in the main scanning direction. More specifically, the first, second, and third dot patterns are assigned to the positions (normalized positions) (0 to 2) as the remainders obtained by dividing the pixel position in the main scanning direction (the horizontal direction of the sheet) by three. In other words, the second affix j (1 to 3) of the dot patterns $A_{ij}$, $B_{ij}$, and $C_{ij}$ indicates the normalized pixel position (0 to 2).

The characteristic features of these dot patterns will be described. Each dot pattern of energy range I of the lowest density consists of a single printed dot. In the first-color dot patterns $A_{11}$, $A_{12}$, and $A_{13}$, printed dots are arranged in a line upwardly inclining from left to right at an 18° angle from the horizontal axis of the sheet when these patterns are printed continuously in the main scanning direction. In the second-color dot patterns $B_{11}$, $B_{12}$, and $B_{13}$, printed dots are aligned in the horizontal direction when these patterns are printed continuously in the main scanning direction. In the third-color dots patterns $C_{11}$, $C_{12}$, and $C_{13}$, printed dots are arranged in a line downwardly inclining from left to right at an 18° angle from the horizontal axis when these patterns are printed continuously in the main scanning direction. Each dot pattern of energy range II of the second-lowest density includes the corresponding dot pattern of energy range I. Each dot pattern of energy range III of the highest density includes the corresponding dot pattern of energy range II. Therefore, the characteristic features of dot alignment of the respective colors are determined in accordance with the dot pattern of energy range I of the lowest density regardless of the normalized pixel position at which the dot pattern changes (that is, even if the energy range changes). More specifically, the texture direction of the first-color dot pattern is the upwardly inclining (from left to right) direction, that of the second-color dot pattern is the horizontal direction, and that of the third-color dot pattern is the downwardly inclining (from left to right) direction. The texture directions of the respective colors differ in this manner.

Figure 43A:
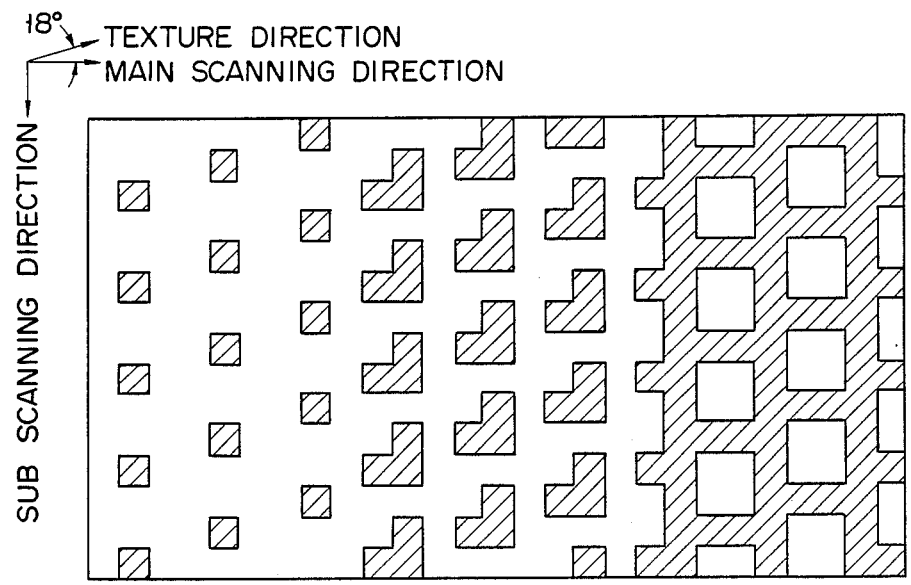
FIGS. 43A to 43C show textures of printed dots of respective colors when an image is printed using the dot patterns shown in FIG. 42.
Figure 43B:
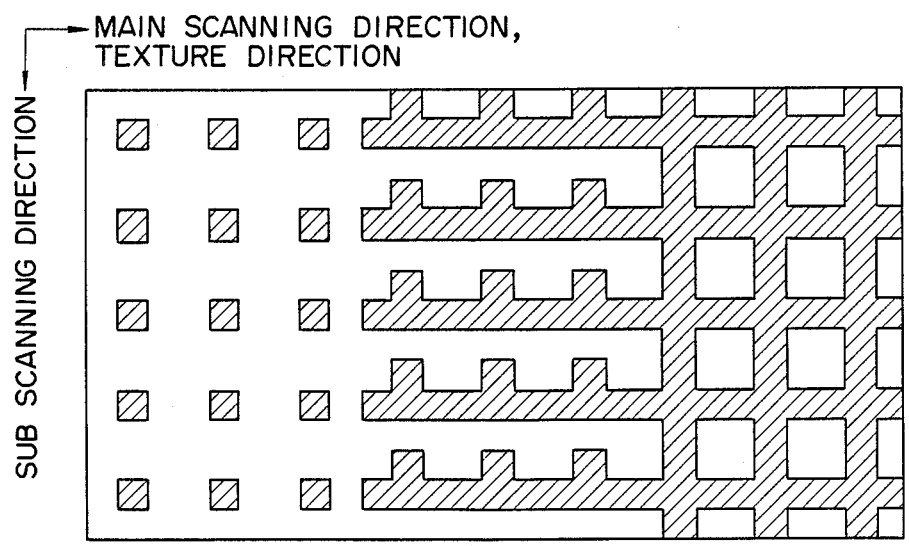
Figure 43C:
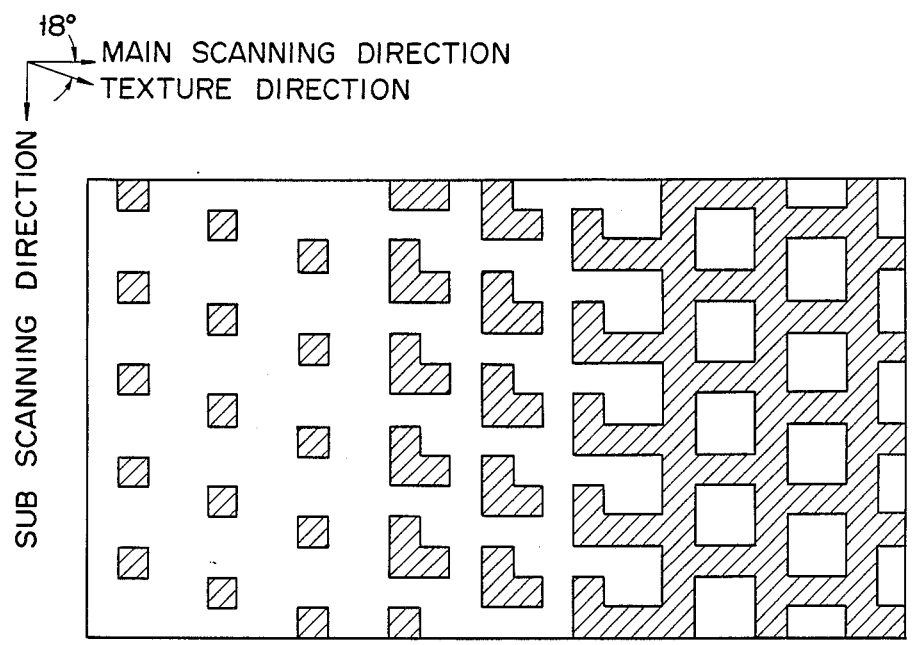

FIGS. 43A to 43C compare the printed patterns of the respective colors. In FIGS. 43A to 43C, the same dot patterns are used in the sub scanning direction, and dot patterns with densities increasing from the left to right are used in the main scanning direction. FIG. 43A shows the printed pattern of the first color (e.g., yellow). The texture directions are two directions: the sub scanning (vertical) direction and a direction deviated from the main scanning direction counterclockwise by 18°. FIG. 43B shows the printed pattern of the second color (e.g., magenta). The texture directions in this case are two directions: the sub and main scanning directions. FIG. 43C shows the printed pattern of the third color (e.g., cyan). The texture directions of this pattern are two directions: the sub scanning direction and a direction deviated from the main scanning direction clockwise by 18°. Therefore, when these printed patterns of the three colors are superposed, the printed dot arrays intersect every three pixels (9 dots), and high frequency and fine moiré fringes are generated in units of 9 dots. As a result, various kinds of ink overlap are periodically formed in a very short cycle and they are appeared to be averaged to the human eyes. Thus, the hue becomes stable.

Conventionally, all the texture directions of patterns of respective colors are the same. Therefore, if the texture directions of printed dots of respective colors are rotated by a mechanical error, visual moiré fringes of low frequency or long cycles are formed and a change of hue in a stripe fashion can be seen. Thus, the image quality is degraded. However, with the patterns of this embodiment, the texture directions of printed dot patterns of respective colors are intentionally misregistered and moiré fringes of short cycles are forcibly generated. Even if the printed patterns of the respective colors are rotated, the moiré fringes do not influence the image quality, unlike in the conventional case, since visible low frequency moiré fringes are not generated. The cycle (9 dots) of the moiré fringes is a short cycle which is not apparent to the naked eye if a thermal head having a resolution of 16 dots/mm is used. The moiré fringes in this case are virtually invisible.

this embodiment, although the positions of printed dots of respective colors in a dot matrix are different in units of pixels, the various kinds of ink overlap patterns are averaged as a whole. Even if the transfer positions of the respective color inks are shifted in parallel by a mechanical error of the printer, the total hue is not varied.

Figure 44:
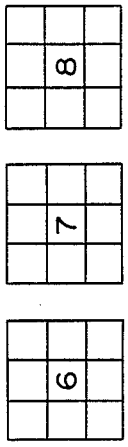
FIG. 44 shows energies injected into the heating members of a thermal head corresponding to the respective dots when 41 half-tone gradation levels are indicated using a single dot pattern shown in FIG. 42.

A description will be made of an injected energy amount applied to the heating members of a thermal head for printing the respective dots when 41 half-tone gradation levels are to be expressed using such a single dot pattern. As an example, FIG. 44 shows the printing energies of the respective dots constituting dot patterns $A_{12}$, $A_{22}$, and $A_{32}$. In FIG. 44, the values at the respective matrix positions indicate the energy amounts injected into the heating members. The blank portions indicate 0 (position where no dot is printed). More specifically, in the low density range (half-tone gradation levels 0 to 8), the formation energy level for a single printed dot constituting dot pattern $A_{12}$ is changed from 0 to 8 so as to express 9 half-tone gradations of levels 0 to 8. In the intermediate density range (half-tone gradation levels 9 to 24), the total energy level of the three printed dots constituting dot pattern $A_{22}$ is changed from 9 to 24 so as to express 16 half-tone gradations of levels 9 to 24. In the high density range (half-tone gradation levels 25 to 40), the total injected energy level of the five printed dots constituting dot pattern $A_{32}$ is changed from 25 to 40 so as to obtain 16 half-tone gradations of levels 25 to 40.

As a result, 41 half-tone gradation levels are obtained by a 3×3 matrix. The same gradation representation is performed for other dot patterns. Since the injected energies for the respective printed dots can be finely controlled without any limits, the number of half-tone gradation levels represented by this pattern can be infinitely increased.

The schematic arrangement of a color image printing apparatus which enables such multi level color printing, reproduces a stable hue, and is free from degradation in image quality caused by moiré fringes, will be described with reference to FIG. 45.

Density signals of the respective colors in units of pixels that are output from multi level gradation signal processing circuit 1 are supplied to multi level dot pattern table 5. Outputs from matrix position setting circuit 2, pixel counter 3, and color setting circuit 4 are also supplied to table 5. An output from table 5 is supplied to thermal head driver circuit 7 via thermal printing control circuit 6.

Multi level gradation signal processing circuit 1 processes a multi level half-tone signal, input as a digital signal from an image memory or from a demodulator or decoder of a transfer system, in accordance with the specifications and characteristics of the printer.

Matrix position setting circuit 2 is necessary for digital printing or pseudo half-tone printing and sets a position to print a dot within a dot matrix which corresponds to a single pixel consisting of plurality of dots. In a normal line printer, setting circuit 2 is interlinked with a dot counter for the main scanning direction and a line counter for the sub scanning direction.

Pixel counter 3 counts the position of a pixel in the main scanning direction. When the obtained position number is 3K+n (K=0, 1, 2, ..., n=0, 1, 2), counter 3 selects a dot pattern whose affix j coincides with n among dot patterns $A_{ij}$, $B_{ij}$, and $C_{ij}$ of FIG. 42 described above. In a normal line printer, counter 3 is interlinked with the dot counter for the main scanning direction. In other words, counter 3 selects a dot pattern in accordance with a normalized pixel position.

Color setting circuit 4 controls the sequence of superposed printing of the three primary printing colors of yellow, magenta, and cyan, or three primary colors determined by the printer used. More specifically, color setting circuit 4 determines which one of the first (yellow), second (magenta), and third (cyan) layers coincides with the layer to be printed. In frame sequential printing using a normal line printer, color setting circuit 4 is interlinked with a page counter.

By the functions of matrix position setting circuit 2, pixel counter 3, and color setting circuit 4, data on the energy amount to be injected into the heating member is read out from a predetermined pattern of multi level dot pattern table 5. In some cases, these circuits can be interlinked with an image signal input clock used by multi level gradation signal processing circuit 1.

Multi level dot pattern table 5 is the main part of this embodiment. As partially described with reference to FIG. 44, table 5 comprises a ROM which stores the matrix positions of the respective dots constituting dot patterns $A_{ij}$, $B_{ij}$ and $C_{ij}$ in units of density levels and the amount of energies to be injected into heating members for forming such dots. Table 5 selects three patterns, e.g., $A_{3j}$ (j=1, 2, 3) in the case of yellow, for the color set by color setting circuit 4 from nine patterns indicating the same density corresponding to an output which is supplied from multi level gradation signal processing circuit 1 and which represents a density level. Furthermore, table 5 selects a dot pattern corresponding to a normalized pixel position set by pixel counter 3, e.g., $A_{32}$. Table 5 then selects data of an injected energy amount for a heating member at a dot position in the dot matrix set by matrix position setting circuit 2.

Thermal printing control circuit 6 is interlinked with thermal head driver circuit 7 and controls the pulse width and pulse height of the drive pulse for each dot of the thermal head. Control circuit 6 is controlled by injected energy data output from multi level dot pattern table 5.

Thermal head driver circuit 7 is an IC circuit having a shift register, a latch, a gate, and a driver (none are shown) and is located on the substrate of a thermal head. In conventional thermal transfer printing of an ink melt type, the interlinked operations of driver circuit 7 and thermal printing control circuit 6 are used to compensate for a heat accumulation phenomenon. However, in this embodiment, they are used to control energy for gradation representation.

The circuit shown in FIG. 45 is the same as that shown in FIG. 1 except for color setting circuit 4.

When printing of the method described above is performed using the thermal printer having the above arrangement, color reproduction without hue variation or moiré fringes can be performed, and a multi level color half-tone image of a high resolution can be obtained, even if a printer not having a particularly good mechanical precision is used.

In the above embodiment, a pixel is represented by a 3×3 dot matrix, and color printing is performed in a total of three colors. An eighth embodiment of the present invention wherein color printing is performed in four colors (e.g., yellow, magenta, cyan, and black) will be described. In the eighth embodiment, a 4×4 dot matrix corresponds to a single pixel. The entire density range is divided into four density ranges. The energy ranges corresponding to the respective density ranges are denoted as ranged I to IV from the lower density range. Four dot patterns are assigned to each range and each color.

FIGS. 46A to 46D show first- to fourth-color dot patterns $D_{ij}$, $E_{ij}$, $F_{ij}$ and $G_{ij}$ (i,j=1 to 4) assigned to density ranges I to IV. The first affix i of the dot patterns $D_{ij}$, $E_{ij}$ and $F_{ij}$ indicates the injected energy range (1 to 4), and the second affix j indicates the normalized pixel position.

Figure 47C:
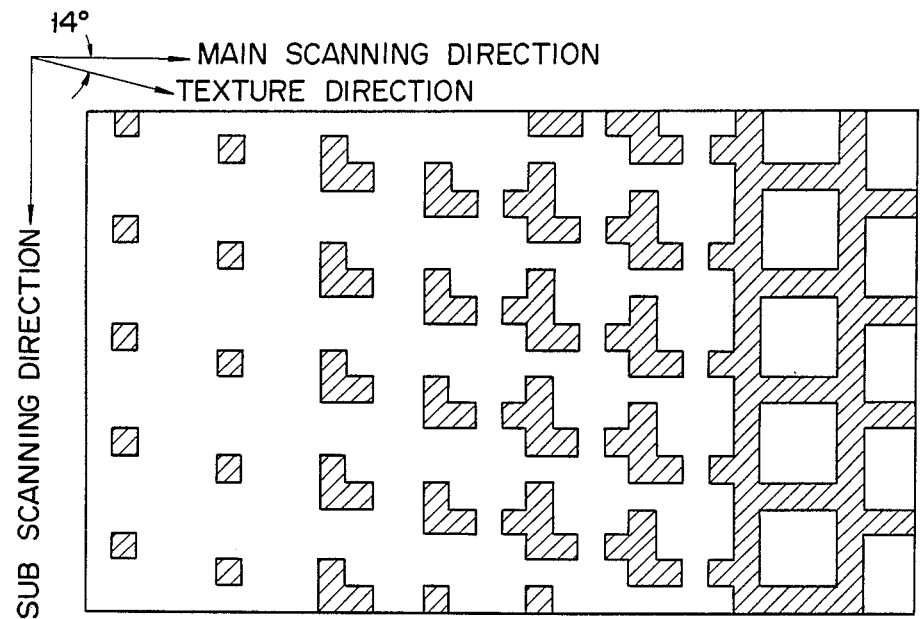
Figure 47D:
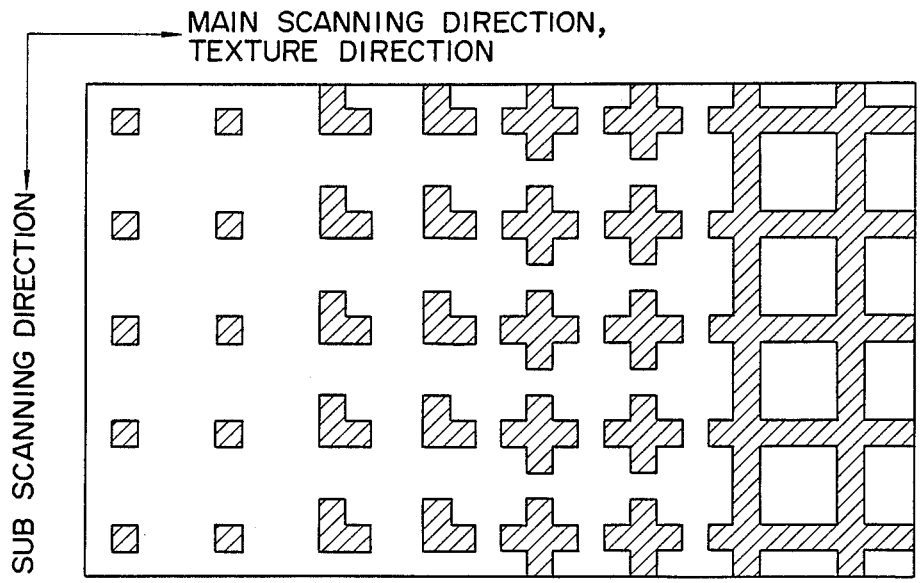

FIGS. 47A to 47D show the textures of the printed dots by the dot patterns shown in FIGS. 46A to 46D. The texture directions of the printed pattern in FIG. 47A are the sub scanning direction and a direction inclined 14° counterclockwise from the main scanning direction. The texture directions of the printed pattern in FIG. 47B are the sub scanning direction and directions inclined 63° clockwise and counterclockwise from the sub scanning direction. The texture directions of the printed pattern in FIG. 47C are the sub scanning direction and a direction inclined 14° clockwise from the main scanning direction. The texture directions of the printed pattern in FIG. 47D are the sub scanning direction and the main scanning direction.

The same effect as that with the seventh embodiment can be obtained with this embodiment.

The present invention is not limited by the matrix size, the number of divisions of the density range, the color sequence, the number of colors, the intersecting angle of the texture directions of the printed dots, and so on. Also, the present invention is not limited to a thermal transfer printing apparatus of an ink melt type, but can be applicable to another multi-level printing method such as thermal printing, thermal transfer printing using a sublimation dye-type ink, and ink-jet printing.

As described above, in the present invention, although the relative positions of the printed dots of the respective colors change in units of pixels since the texture direction in which the printed dots appear to form is positively changed in units of colors, they are averaged. Therefore, the hue is not influenced even if the printed dots of the respective colors are misregistered. Moiré fringes are formed by cyclical changes of the hue. However, since the moiré fringes have a high frequency, which has a negligable visual effect, they are not evident to the human eye. As a result, a color image having an overall stable hue which is free from the adverse influence of moiré fringes can be obtained.

What is claimed is:

1. A color image printing apparatus comprising:
   dot printing means for printing dots of at least two colors on a printing medium; and
   control means for controlling said dot printing means such that only a predetermined dot or dots in accordance with a density of each pixel in units of colors in a dot matrix corresponding to one pixel are printed,
   wherein positions of printed dots in the dot matrix are determined such that angles of two texture directions of the printed dots which are generated upon printing of pixels arranged in a two-dimensional manner are different for each color.

2. An apparatus according to claim 1, in which said control means controls said dot printing means such that texture directions of printed dots of a single color are vertical and horizontal directions, and texture directions of printed dots of other colors are vertical and different oblique directions.

3. An apparatus according to claim 1, in which said control means prints each pixel by dots printed at different positions in the dot matrix in units of colors.

4. A thermal color image printing apparatus comprising:
   dot printing means for printing dots of at least two colors on a printing medium;
   means for moving one of said dot printing means and printing medium with respect to the other of said dot printing means and printing medium, to form a dot matrix on the printing medium;
   table means for storing position data indicating a predetermined dot or dots in the dot matrix corresponding to a printing region of a single pixel and numerical data indicating an energy value which is applied to said dot printing means in order to print the dots, the position data being stored as a dot pattern, the dot pattern of each having two texture directions, one being a direction which is common to all the colors and along which one of said dot printing means and said printing medium is moved by said moving means and the other being an arbitrary direction which is different for each color; and
   means, interlinked with said moving means, for reading out the position data and numerical data corresponding to each pixel of each color from said table means for each printing position of each pixel and for controlling said dot printing means.

5. An apparatus according to claim 4, in which said table means stores a set of dot patterns comprising a plurality of dot patterns in units of densities, each of said plurality of dot patterns being assigned to a plurality of pixels in a one-dimensional direction in accordance with its relative position in the set, the sets of dot patterns having texture directions.

6. An apparatus according to claim 5, in which said dot printing means forms dots of n colors (n is an integer of 2 or more), and
   said table means causes an n×n dot matrix to correspond to a printing region of a single pixel and forms a single set of dot patterns by n dot patterns.

7. An apparatus according to claim 6, in which said table means stores a single set of dot patterns for each of a plurality of densities.

8. An apparatus according to claim 6, in which said dot printing means forms dots of three colors, and the texture directions are a first direction which is common to all the colors and along which one of said dot printing means and said printing medium is moved by said moving means, and a direction inclined 18° counterclockwise from a second direction which crosses the first direction and along which one of said dot printing means and said printing medium is moved by said moving means for a first color, the first and second directions for a second color, and the first direction and a direction inclined 18° clockwise from the second direction for a third color.

9. An apparatus according to claim 6, in which said dot printing means forms dots of four colors, and the texture directions are a first direction which is common to all the colors and along which one of said dot printing means and said printing medium is moved by said moving means and a direction inclined 14° counterclockwise from a second direction which crosses the direction which is common to all of the colors and along which one of said dot printing means and said printing medium is moved by said moving means for a first color, the first direction and directions inclined 63° clockwise and counterclockwise from the first direction for a second color, the first direction and a direction inclined 14° clockwise from the second direction for a third color and the first and second directions for a fourth color.

* * * * *